United States Patent
Kozlova et al.

(10) Patent No.: US 11,405,424 B1
(45) Date of Patent: Aug. 2, 2022

(54) DISPLAYING A FIREWALL POLICY INTERFACE

(71) Applicant: Juniper Networks, Inc., Sunnyvale, CA (US)

(72) Inventors: Yelena Kozlova, Sunnyvale, CA (US); Amol Sood, Cupertino, CA (US); Lyubov Nesteroff, Pleasant Hill, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 304 days.

(21) Appl. No.: 16/412,066

(22) Filed: May 14, 2019

(51) Int. Cl.
*H04L 9/40* (2022.01)
*G06F 3/0482* (2013.01)
*G06F 3/0484* (2022.01)

(52) U.S. Cl.
CPC .......... *H04L 63/20* (2013.01); *G06F 3/0482* (2013.01); *G06F 3/0484* (2013.01)

(58) Field of Classification Search
CPC ....... H04L 63/20; G06F 3/0482; G06F 3/0484
USPC .......................................................... 726/1
See application file for complete search history.

(56) References Cited

U.S. PATENT DOCUMENTS

| | | | | |
|---|---|---|---|---|
| 2003/0098878 A1* | 5/2003 | Conley, Jr. | .......... | G06F 16/9566 715/748 |
| 2005/0260996 A1* | 11/2005 | Groenendaal | ......... | H04L 63/102 455/445 |
| 2005/0262554 A1 | 11/2005 | Brooks et al. | | |
| 2006/0156403 A1* | 7/2006 | Haeffele | ............. | H04L 63/0218 726/23 |
| 2007/0094617 A1* | 4/2007 | Nurmi | ................. | G06F 3/04842 715/856 |
| 2007/0118893 A1* | 5/2007 | Crawford | ............ | H04L 63/0245 726/11 |
| 2007/0209058 A1* | 9/2007 | Anantharamiah | .. | H04L 41/0806 726/1 |
| 2015/0074750 A1* | 3/2015 | Pearcy | .................. | G06F 21/566 726/1 |
| 2016/0112374 A1* | 4/2016 | Branca | ................ | H04L 63/0227 726/1 |

OTHER PUBLICATIONS

TinyCP, "Lightweight Linux Control Panel", https://tinycp.com/, Apr. 25, 2018, 1 page.

* cited by examiner

*Primary Examiner* — Jacob Lipman
(74) *Attorney, Agent, or Firm* — Harrity & Harrity, LLP

(57) ABSTRACT

A device may generate a display of a firewall policy management GUI. The device may generate a display in the firewall policy management GUI of a list of existing firewall policies and a firewall policy interface that is adjacent to the list of existing firewall policies in a same view of the firewall policy management GUI. The device may generate a display in the firewall policy management GUI of at least one of a plurality of candidate sources for a new firewall policy, a plurality of candidate destinations for the new firewall policy, or a plurality of candidate security configurations for the new firewall policy. The device may display, in the firewall policy interface, at least one of a first column that includes two or more sources, a second column that includes two or more destinations, or a third column that includes two or more security configurations.

20 Claims, 17 Drawing Sheets

Firewall Policy Management GUI

| Policy Name | Description | | Schedule | Logging ◯ | Save |

ACTION

SOURCE

| Addresses (ADDR) |
| ADDR1 |
| ADDR2 |
| Users (USER) |
| USER1 |
| USER2 |
| Sites (SITE) |
| SITE1 |
| SITE2 |
| Site Groups (STGR) |
| STGR1 |
| STGR2 |
| *View more sources* |

DESTINATION

+ Select Destination

SECURITY

+ Select Security

| | ACTION | DESTINATION | SECURITY |
|---|---|---|---|
| 1 | ⊖ | SITE3 | Default |
| 2 | ⊘ | ADDR3 | IPS1 |
| 3 › POLICY3 DEPT1 | ⊖ | USER4 STGP2 | IPS1 |

104 Display a plurality of source categories and candidate sources

Device

Firewall Policy Management GUI

| Policy Name | Description | | Schedule | Logging ◯ | Save |

SOURCE     ACTION     DESTINATION     SECURITY

SOURCE1 &    ⊖    DESTINATION1 &

SOURCE2           DESTINATION2     + Select Security

+ Select Source        + Select Destination

| | NAME | SOURCE | ACTION | DESTINATION | SECURITY |
|---|---|---|---|---|---|
| 1 > | POLICY1 | USER1 USER2 | ⊖ | SITE3 | Default |
| 2 > | POLICY2 | SITE1 | ⊘ | ADDR3 | IPS1 |
| 3 > | POLICY3 | DEPT1 | ⊖ | USER4 STGP2 | IPS1 |

100 ⟶

116 Display one or more destinations for a firewall policy

Device

FIG. 1I

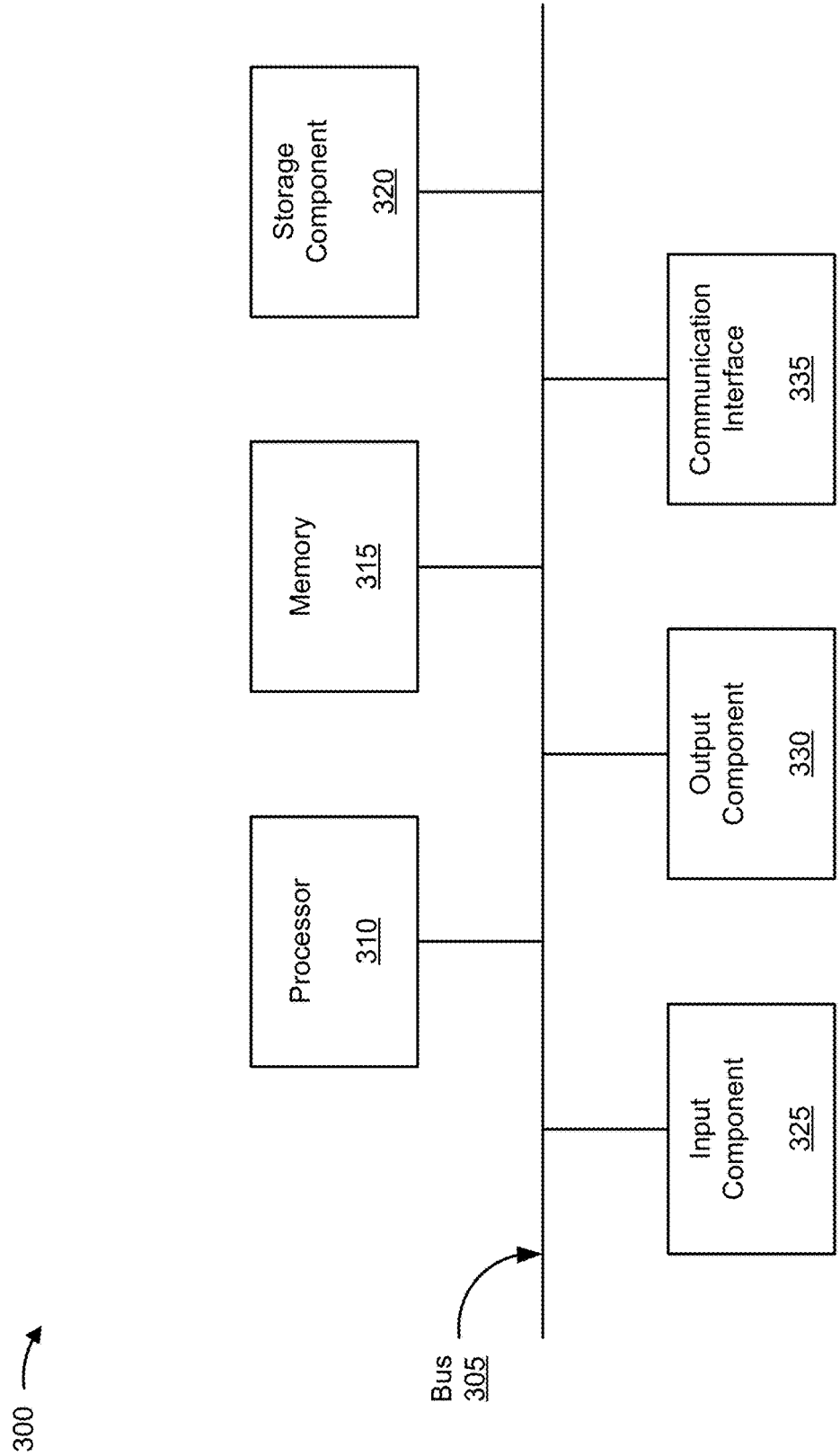

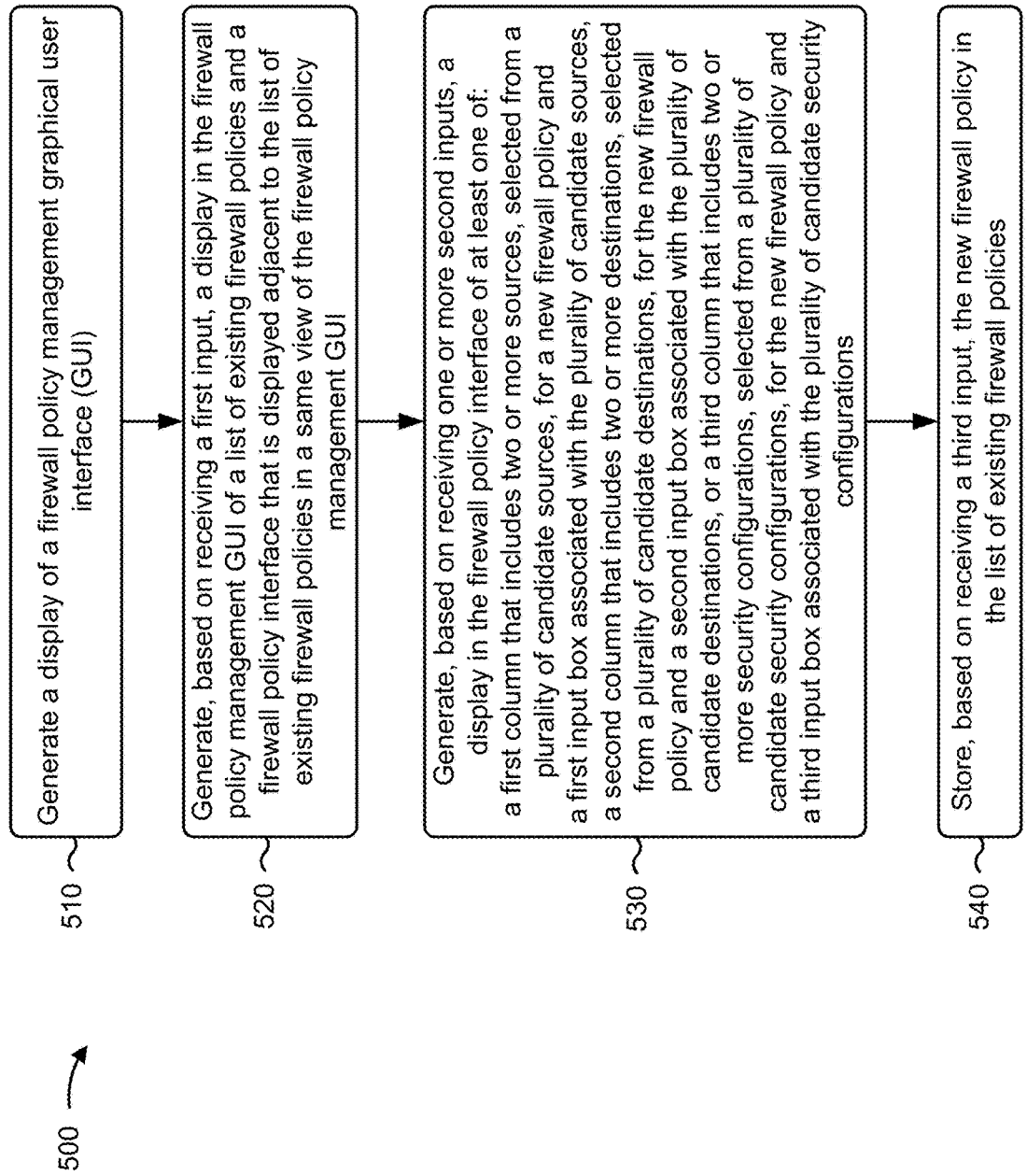

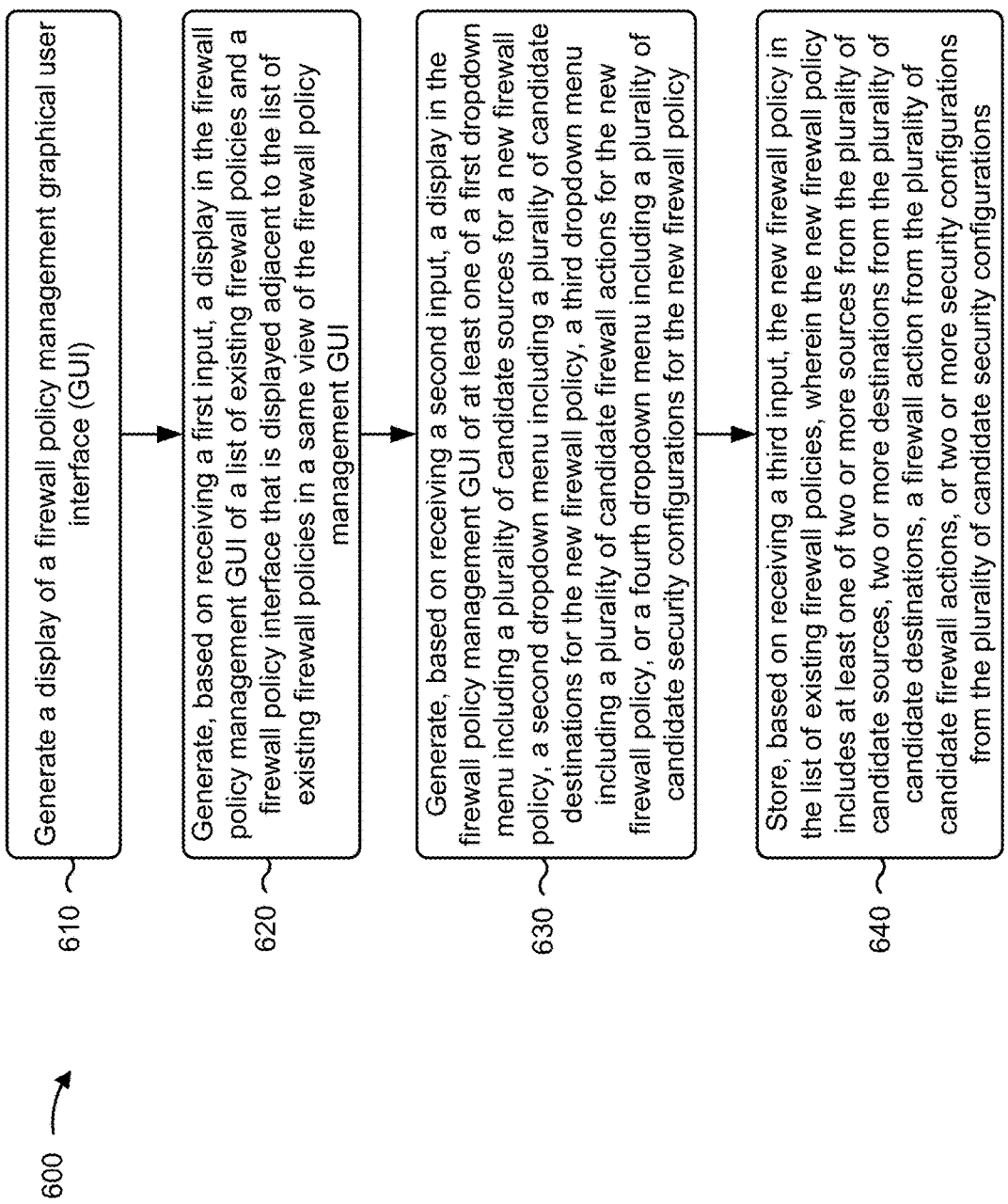

DISPLAYING A FIREWALL POLICY INTERFACE

BACKGROUND

A firewall may include a combination of hardware and software that provides a barrier between trusted devices and/or networks and untrusted devices and/or networks. A firewall device may implement a firewall by monitoring traffic (e.g., to and from an untrusted device and/or network), performing firewall actions on the traffic, applying one more other security actions, and/or the like.

SUMMARY

According to some implementations, a method may include generating, by a device, a display of a firewall policy management graphical user interface (GUI); generating, by the device and based on receiving a first input, a display in the firewall policy management GUI of: a list of existing firewall policies, and a firewall policy interface that is displayed adjacent to the list of existing firewall policies in a same view of the firewall policy management GUI; generating, by the device and based on receiving one or more second inputs, a display in the firewall policy management GUI of at least one of: a plurality of candidate sources for a new firewall policy, a plurality of candidate destinations for the new firewall policy, or a plurality of candidate security configurations for the new firewall policy; and generating, by the device and based on receiving one or more third inputs, a display in the firewall policy interface of at least one of: a first column that includes two or more sources from the plurality of candidate sources, a second column that includes two or more destinations from the plurality of candidate destinations, or a third column that includes two or more security configurations from the plurality of candidate security configurations.

According to some implementations, a device may include one or more memories and one or more processors, communicatively coupled to the one or more memories, configured to: generate a display of a firewall policy management GUI; generate, based on receiving a first input, a display in the firewall policy management GUI of: a list of existing firewall policies, and a firewall policy interface that is displayed adjacent to the list of existing firewall policies in a same view of the firewall policy management GUI; generate, based on receiving one or more second inputs, a display in the firewall policy interface of at least one of: a first column that includes: two or more sources, selected from a plurality of candidate sources, for a new firewall policy, and a first input box associated with the plurality of candidate sources, a second column that includes: two or more destinations, selected from a plurality of candidate destinations, for the new firewall policy, and a second input box associated with the plurality of candidate destinations, or a third column that includes: two or more security configurations, selected from a plurality of candidate security configurations, for the new firewall policy, and a third input box associated with the plurality of candidate security configurations; and store, based on receiving a third input, the new firewall policy in the list of existing firewall policies.

According to some implementations, a non-transitory computer-readable medium may store one or more instructions. The one or more instructions, when executed by one or more processors of a device, may cause the one or more processors to: generate a display of a firewall policy management GUI; generate, based on receiving a first input, a display in the firewall policy management GUI of: a list of existing firewall policies, and a firewall policy interface that is displayed adjacent to the list of existing firewall policies in a same view of the firewall policy management GUI; generate, based on receiving a second input, a display in the firewall policy management GUI of at least one of: a first dropdown menu including a plurality of candidate sources for a new firewall policy, a second dropdown menu including a plurality of candidate destinations for the new firewall policy, a third dropdown menu including a plurality of candidate firewall actions for the new firewall policy, or a fourth dropdown menu including a plurality of candidate security configurations for the new firewall policy; and store, based on receiving a third input, the new firewall policy in the list of existing firewall policies, wherein the new firewall policy includes at least one of: two or more sources from the plurality of candidate sources, two or more destinations from the plurality of candidate destinations, a firewall action from the plurality of candidate firewall actions, or two or more security configurations from the plurality of candidate security configurations.

BRIEF DESCRIPTION OF THE DRAWINGS

FIGS. 1A-1K are diagrams of one or more example implementations described herein.

FIGS. 3A and 3B are diagrams of example components of one or more devices of FIG. 2.

FIGS. 4-6 are flow charts of example processes for displaying a firewall policy interface.

DETAILED DESCRIPTION

Figure 1A:
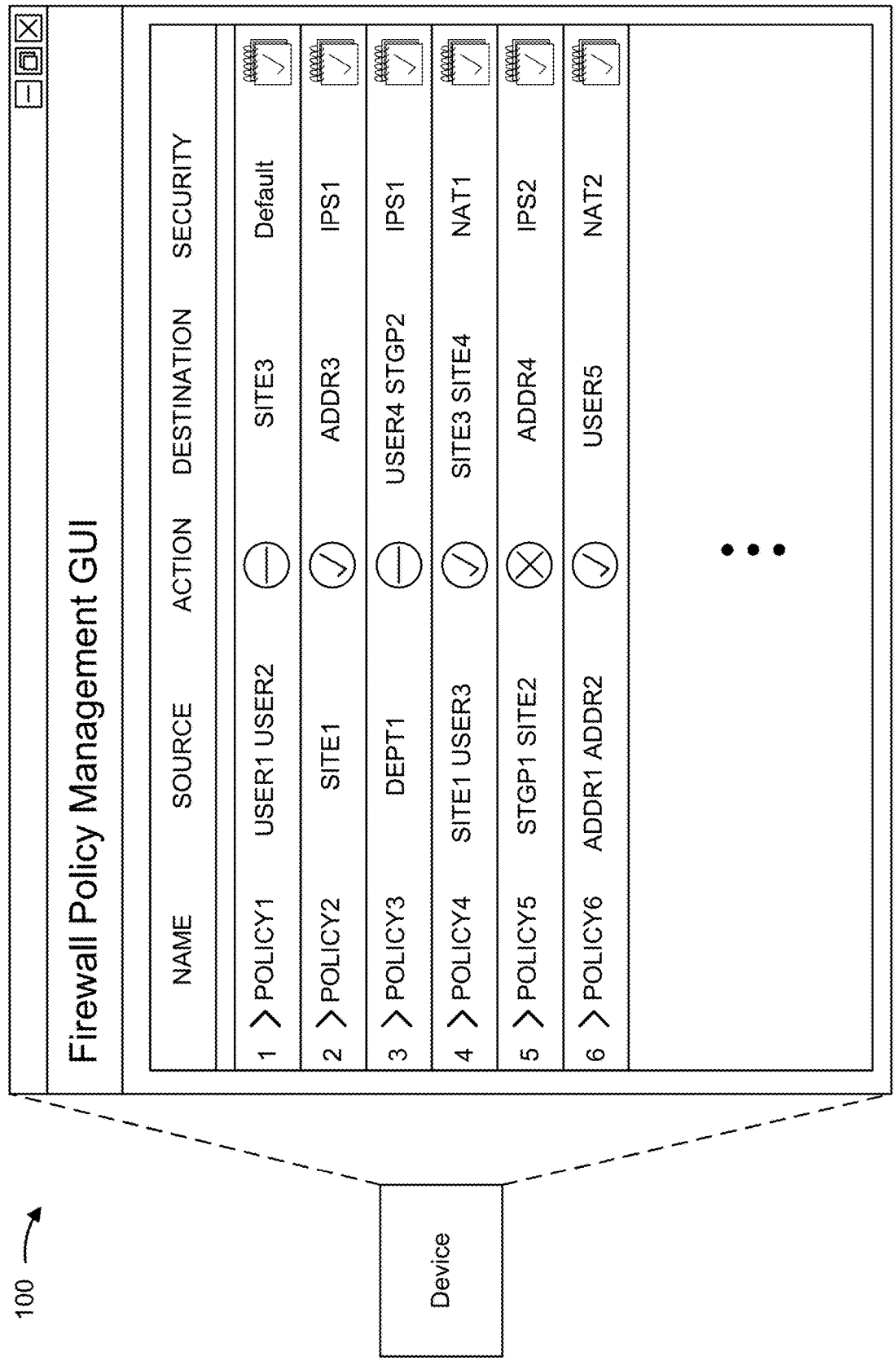

The following detailed description of example implementations refers to the accompanying drawings. The same reference numbers in different drawings may identify the same or similar elements.

A device (e.g., a firewall device and/or another type of device) may provide a firewall policy management graphical user interface (GUI) that permits a user to create new firewall policies, edit existing firewall policies, and/or otherwise manage firewall policies. A firewall policy may include a policy or rule that is to be applied and/or enforced on particular types of network traffic. The firewall policy management GUI may permit the user to specify one or more parameters for a firewall policy, modify one or more parameters for a firewall policy, view parameters of a firewall policy, and/or the like.

Some firewall policy management GUIs that are provided for firewall policy management may have inefficient and/or cumbersome layouts that may result in increased consumption of processing, memory and/or networking resources when generating, modifying, and/or viewing firewall policies, that may cause increases in the time duration of generating new firewall policies, and/or the like. As an example, some firewall policy management GUIs may provide a firewall policy interface that at least partially obscures a user's view of existing firewall policies (e.g., by placing the firewall policy interface over a display of the existing firewall policies, by causing the user to navigate away from the display of the existing firewall policies to a standalone firewall policy interface, and/or the like). As a result, the user is required to switch between viewing the firewall policy interface and the existing firewall policies when generating a new firewall policy in order to reference the existing firewall policies to determine which parameters to include in the new firewall policy.

As another example, some firewall policy management GUIs may provide a "wizard" or multi-page firewall policy interface for generating a new firewall policy. In this case, the user is required to navigate and click through a plurality of screens, pages, and/or views in order generate a new firewall policy. As a result, the device providing the firewall policy management GUI consumes processing, memory, and/or network resources in generating and displaying each of the plurality of screens, pages, and/or views. Moreover, since each of the plurality of screens, pages, and/or views needs to be loaded before the user can provide input to the wizard or multi-page interface, the cumulative loading times of the plurality of screens, pages, and/or views increases the time duration of generating a new firewall policy.

As a further example, some firewall policy management GUIs do not permit a firewall policy to be generated for a combination of sources and/or destinations. That is, some firewall policy management GUIs only permit a firewall policy to have one source and one destination. As a result, a plurality of firewall policies may need to be generated in order to ensure that multiple combinations of sources and/or destinations are covered by a firewall policy, which increases the quantity of firewall policies that need to be generated, which in turn increases the consumption of processing, memory, and/or network resources in generating the firewall policies.

Some implementations described herein provide a device that is capable of generating an efficient and intuitive firewall policy management GUI. The firewall policy management GUI may include a display of a list of existing firewall policies adjacent to a firewall policy interface (e.g., for generating and/or modifying firewall policies) in the same view or page, such that a user of the firewall policy management GUI is provided with an unobstructed view of the existing firewall policies and the firewall policy interface. Moreover, the firewall policy interface may display the parameters of a firewall policy, and the corresponding input fields for the parameters, in a single view such that the user can easily view and comprehend the purpose of the firewall policy, such that the user can view existing firewall policies when generating a new firewall policy, and/or the like. As a result, the device generates fewer screens, pages, and/or views when the user is generating a new firewall policy, which reduces the device's consumption of processing, memory, and/or network resources in generating and displaying the firewall policy management GUI, decreases the time duration of generating the new firewall policy, and/or the like.

Moreover, the firewall policy interface may permit the user to generate complex and customizable firewall policies by permitting the user to select combinations of a plurality of sources, destinations, and/or security configurations for a firewall policy. This increases the flexibility in generating firewall policies, decreases the quantity of firewall policies that need to be generated in order to enforce firewall policies for traffic associated with various combinations of sources and destinations (e.g., relative to generating firewall policies for individual source and destination combinations), and/or the like.

FIGS. 1A-1K are diagrams of one or more example implementations 100 described herein. As shown in FIGS. 1A-1K, example implementations 100 may include a device. The device may include various types of devices that may provide a firewall policy management GUI. The firewall policy management GUI may include an interface that permits users to create new firewall policies, edit existing firewall policies, and/or the like. Devices that implement a firewall (e.g., a firewall device, an intrusion prevention system (IPS) device, and/or the like) may enforce the firewall policies managed using the firewall policy management GUI.

In some implementations, the device may generate the firewall policy management GUI for display on the device. In some implementations, the device may include a device that implements a firewall, and the device may generate the firewall policy management GUI for display on another device (e.g., a user device and/or another type of device that includes or is associated with a display device). In this case, the device may host the firewall policy management GUI at an address (e.g., an Internet protocol (IP) address and/or another type of address) such that the other device may access the firewall policy management GUI using hypertext transfer protocol (HTTP) and/or other protocols.

As shown in FIG. 1A, the firewall policy management GUI may include a display of one or more existing firewall policies (e.g., firewall policies that have been generated and stored by the device and/or another device). The one or more existing firewall policies may be displayed in a list format, in a tile or card format, in a table, and/or other display formats. In some implementations, the device may display all of the existing firewall policies in a single view or page of the firewall policy management GUI, and users may scroll through the existing firewall policies (e.g., the list of all of the existing firewall policies, tiles or cards of all of the existing firewall policies, and/or the like. In some implementations, the device may display a subset of the existing firewall policies in a single view or page of the firewall policy management GUI such that users may navigate to different pages to view different subsets of the existing firewall policies.

The firewall policy management GUI may include a display of one or more parameters for each existing firewall policy. As shown in the example in FIG. 1A, the one or more parameters may include a policy name, one or more sources, a firewall action, one or more destinations, one or more security configurations, and/or the like. The one or more sources may include entities that generate and/or forward traffic. The firewall policy management GUI may further display a source category associated with respective sources of a firewall policy. Source categories may include users, sites (e.g., office locations of an entity, office buildings of an entity, and/or the like), site groups (e.g., groups of users that are located at a particular site), departments (e.g., departments of an entity), addresses (e.g., IP addresses, port identifiers, and/or the like), applications (e.g., particular application types, particular groups of applications, and/or the like), and/or other user-configured categories.

The one or more destinations may include entities that receive traffic (e.g., that are a destination of the traffic). The firewall policy management GUI may further display a destination category associated with respective destinations of a firewall policy. Destination categories may include categories similar to the source categories described above and/or other categories.

The firewall action may include an action that the device and/or other devices are to take in regard to traffic that is transmitted from the one or more sources to the one or more destinations. The display of the firewall action may include a display of text describing the firewall action, an icon and/or other visual representation of the firewall action, and/or the like. An example firewall action, associated with a firewall policy, may include an Allow (or Accept) action, which may include allowing traffic from a source associated with the firewall policy to pass through the firewall and to be transmitted to a destination associated with the firewall policy. Another example firewall action, associated with a firewall policy, may include a Deny action, which may include discarding and/or dropping traffic from a source associated with the firewall policy to pass through the firewall and to be transmitted to a destination associated with the firewall policy without transmitting an indication to the source that the traffic was discarded and/or dropped. Another example firewall action, associated with a firewall policy, may include a Reject action, which may include discarding and/or dropping traffic from a source associated with the firewall policy to pass through the firewall and to be transmitted to a destination associated with the firewall policy and transmitting an indication to the source that the traffic was discarded and/or dropped.

The one or more security configurations may include a configuration that specifies additional security actions (e.g., a deep packet inspection action, forwarding traffic to a proxy server, and/or the like) that the device and/or other devices are to perform for traffic that is transmitted from the one or more sources and to the one or more destinations. The firewall policy management GUI may further display a security configuration category associated with respective security configurations of a firewall policy. Security configuration categories may include an intrusion prevention system (IPS) category (which may include one or more IPS security configurations having varying intrusion prevention parameters), a network address translation (NAT) category (which may include one or more NAT security configurations having varying NAT parameters), a default security configuration, and/or the like.

The display of an existing firewall policy may include additional information associated with a firewall policy, such as an indication of whether a schedule has been created for the existing firewall policy (e.g., a schedule that specifies particular times, time ranges, days, day ranges, and/or the like that the existing firewall policy is to be enforced by the device and/or other devices), whether logging has been enabled for the firewall policy (e.g., whether the device and/or other devices enforcing the existing firewall policy are to store information identifying actions that are taken in regard to the existing firewall policy, devices that are involved in the actions that are taken in regard to the existing firewall policy, information associated with the traffic involved in the enforcement of the existing firewall policy, and/or the like), and/or the like. In some implementations, the indication of whether a schedule has been created and/or the indication of whether logging has been enabled may include a text-based indication, an icon or other visual representation, and/or the like.

As further shown in FIG. 1A, the firewall policy management GUI may permit the generation of firewall policies that are configured for a plurality of sources, a plurality of destinations, and/or a plurality of security configurations. For example, firewall policy POLICY1 includes two sources (e.g., USER1 and USER2) for a single destination (e.g., SITE3) instead of needing separate firewall policies for each source. As another example, firewall policy POLICY3 includes two destinations (e.g., USER4 and STGP2) for a single source (e.g., DEPT1) instead of needing separate firewall policies for each destination.

Figure 1B:
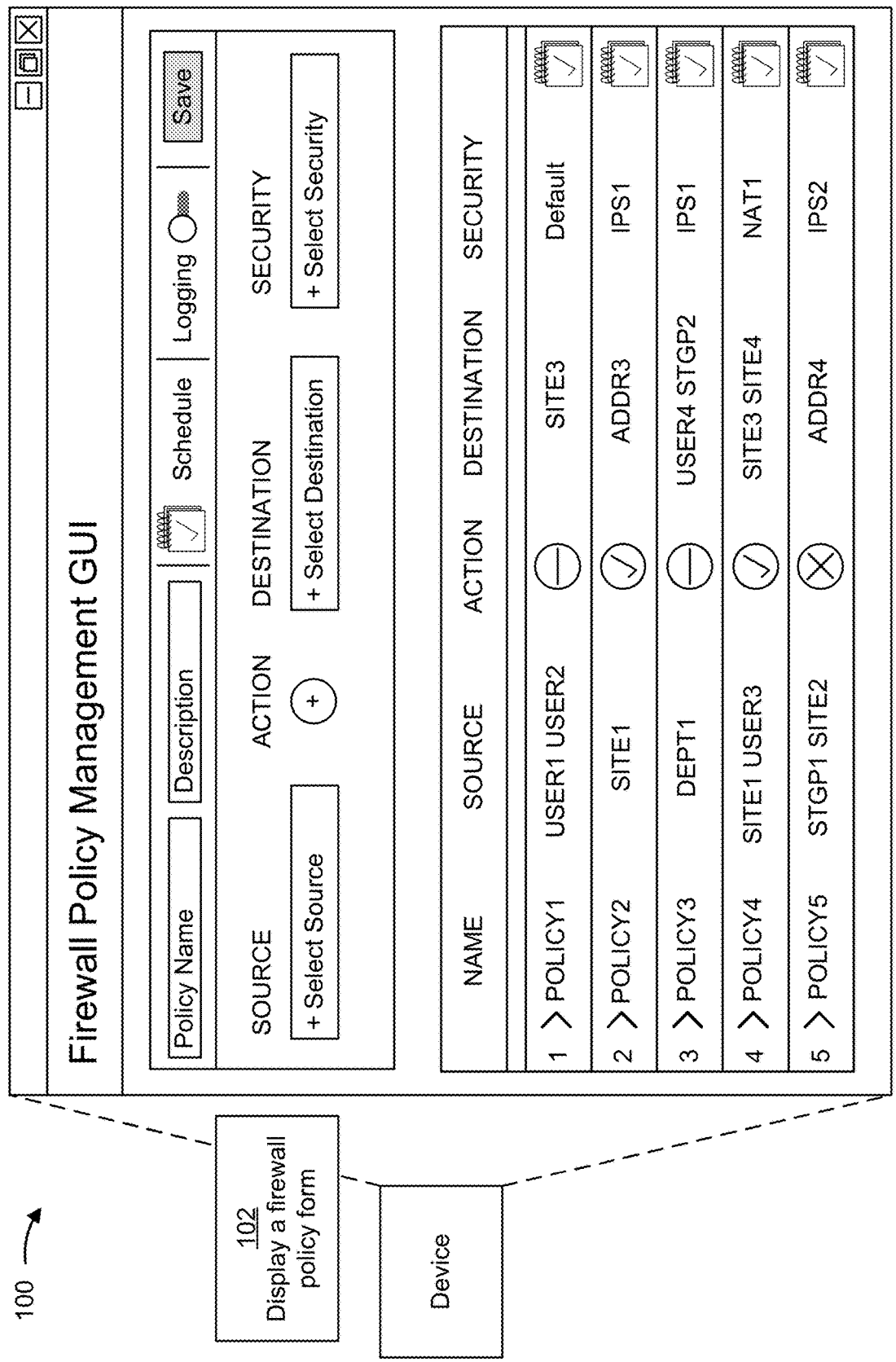

As shown in FIG. 1B, and by reference number 102, the device may generate a display (and/or may display), in the firewall policy management GUI, of a firewall policy interface. The firewall policy interface may include an electronic form and/or another type of interface that permits a user to provide input to specify one or more parameters for generating a new firewall policy, for modifying an existing firewall policy, and/or the like.

As shown in FIG. 1B, the firewall policy interface may be displayed adjacent to the list of existing firewall policies. The firewall policy interface may be displayed such that the firewall policy interface and the list of existing firewall policies do not overlap, which prevents the firewall policy interface from obscuring and/or obstructing the view of the list of existing firewall policies, and the list of existing firewall policies from obscuring and/or obstructing the view of the firewall policy interface. The firewall policy interface and the list of existing firewall policies may be independently scrollable such that a user may scroll through the list of existing firewall policies when generating and/or modifying firewall policies.

In some implementations, the device may display the firewall policy interface based on receiving an input via the firewall policy management GUI. For example, the device may display the firewall policy interface based on a user interacting with an existing firewall policy in the list of existing firewall policies. In this case, the user may click, touch, and/or otherwise provide input to select an existing firewall policy. The device may display the firewall policy interface, and the one or more parameters of the selected existing firewall policy, such that the user may view and edit the one or more parameters using the firewall policy interface.

As another example, the device may display the firewall policy interface based on a user selecting a portion of the firewall policy management GUI (e.g., an icon, a button, and/or the like) in order to generate a new policy rule. In this case, the user may click, touch, and/or otherwise provide input to generate a new policy rule. The device may display the firewall policy interface such that the user may provide input, via the firewall policy interface, to specify one or more parameters for the new policy rule.

As shown in FIG. 1B, the firewall policy interface may include a display of a plurality of input fields for generating and/or modifying firewall policies. For example, the firewall policy interface may include a policy name input field (e.g., an input box and/or the like in which a user may specify a name for a firewall policy), a description input field (e.g., an input box and/or the like in which a user may specify a text-based description of the purpose of the firewall policy, notes regarding the firewall policy, and/or the like), a schedule input field (e.g., a field, a calendar application, and/or the like, which permits a user to specify and/or modify a schedule associated with enforcement of a firewall policy), a logging input field (e.g., a radio button, a toggle field, a check box, and/or the like which permits a user to specify whether activity associated with a firewall policy is to be enabled), a source input field (e.g., an input box and/or the like in which a user may specify one or more sources associated with the firewall policy), a firewall action input field (e.g., an input box and/or the like in which a user may specify a firewall action associated with the firewall policy), a destination input field (e.g., an input box and/or the like in which a user may specify one or more destinations associated with the firewall policy), a security configuration input field (e.g., an input box and/or the like in which a user may specify one or more security configurations associated with the firewall policy), and/or the like.

Moreover, the firewall policy interface may include a display of a plurality of columns, where each column may be associated with respective parameters of the one or more parameters for a firewall policy. For example, the firewall policy interface may include a column for specifying and displaying the one or more sources associated with the firewall policy and the source input field, a column for specifying and displaying the firewall action associated with the firewall policy and the firewall action input field, a column for specifying and displaying the one or more destinations associated with the firewall policy and the destination input field, a column for specifying and displaying the one or more security configurations associated with the firewall policy and the security configuration input field, and/or the like.

The plurality of columns may be displayed in the firewall policy interface such that the plurality of columns may be viewed in the same view, page, and/or screen of the firewall policy management GUI (e.g., such that a user does not need to navigate through a plurality of views, pages, and/or screens in order to specify the one or more parameters). For example, the plurality of columns may be displayed in an adjacent manner and/or in an order that intuitively describes the purpose or function of the firewall policy. As an example, and as shown in FIG. 1B, the source column may be displayed adjacent to the firewall action policy, the firewall action column may be displayed adjacent to the destination column, and the destination column may be displayed adjacent to the security configuration column. In other example, a different ordering of the plurality of columns may be displayed, greater or fewer columns may be displayed, and/or the like.

As shown in FIG. 1C, and by reference number 104, the device may receive an input, via the firewall policy interface, associated with the source input field. For example, the user may select the source input field in order to input one or more sources for a firewall policy (e.g., a new firewall policy, an existing firewall policy, and/or the like). The device may generate, based on receiving the input, a display of (and/or may display) a dropdown menu that includes a plurality of candidate sources and/or one or more source categories in which the plurality of candidate sources are included. That is, each of the candidate sources may be arranged in the dropdown menu based on the source category in which each candidate source is included. In some implementations, the user may select sources from the dropdown menu, may begin typing a name of a source which may cause the plurality of candidate sources and/or source categories listed in the dropdown menu to update, may select an option in the dropdown menu to view more sources, and/or the like.

Figure 1D:
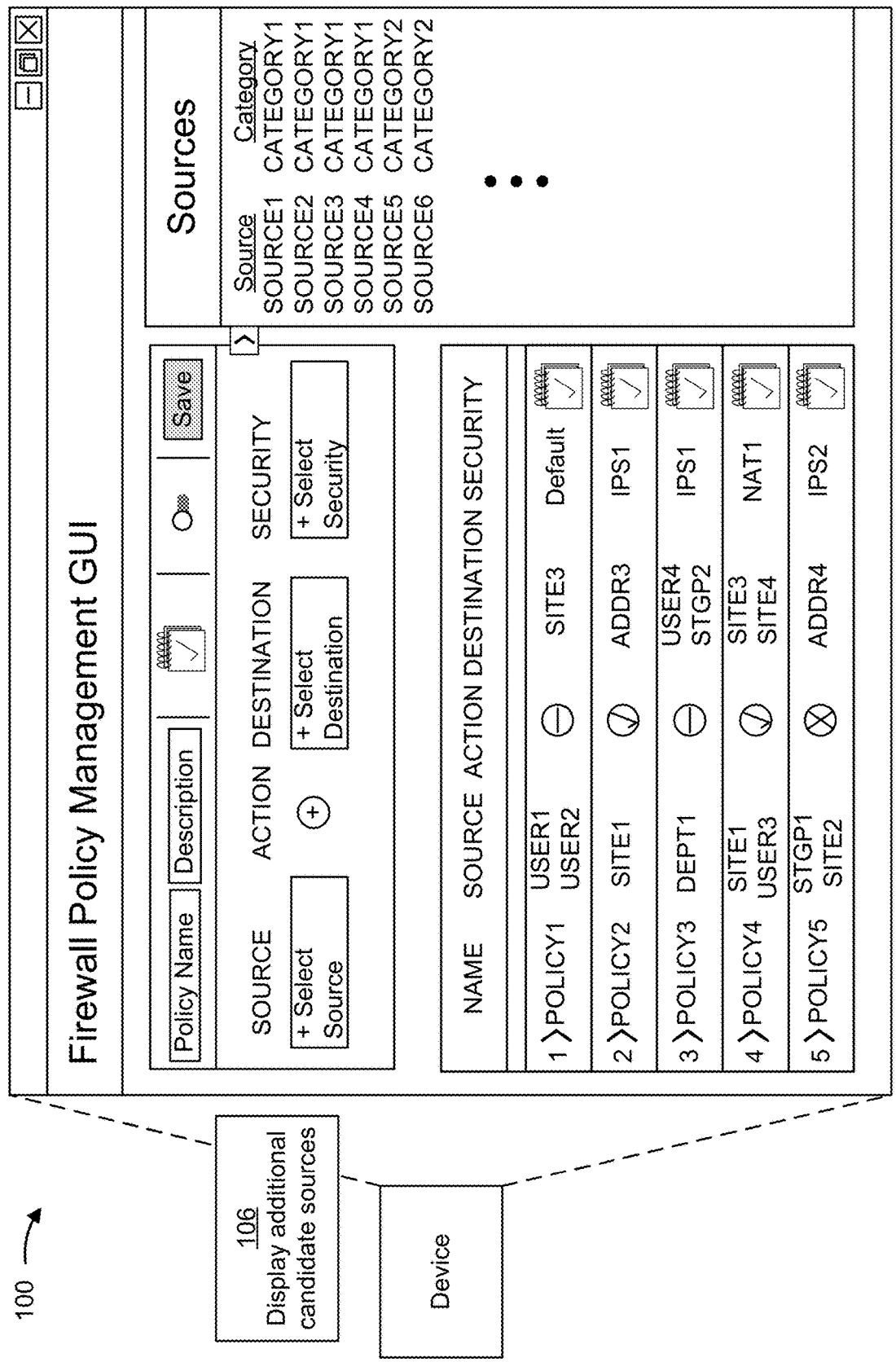

As shown in FIG. 1D, and by reference number 106, the device may generate a display of (and/or may display) a panel (e.g., a side panel, a bottom panel, and/or the like), in the firewall policy management GUI, that includes additional sources that may be selected for the firewall policy. For example, the device may generate the display of the panel based on receiving an input associated with the selection of the option in the dropdown menu to view more sources. The panel may display the sources that were included in the dropdown menu in addition to the additional sources. Moreover, the panel may permit a user to generate new sources and/or source categories, edit sources and/or source categories, and/or the like.

The device may adjust the size of the firewall policy interface and/or the list of existing firewall policies when the panel is displayed in the firewall policy management GUI. For example, the device may decrease the width, length, and/or the like of the firewall policy interface and/or the list of existing firewall policies when the panel is displayed, may increase the width, length, and/or the like of the firewall policy interface and/or the list of existing firewall policies when the panel is displayed, and/or the like. In this way, the panel does not overlap, cover, obscure, and/or obstruct the view of the firewall policy interface and/or the list of existing firewall policies when the panel is displayed.

Figure 1E:
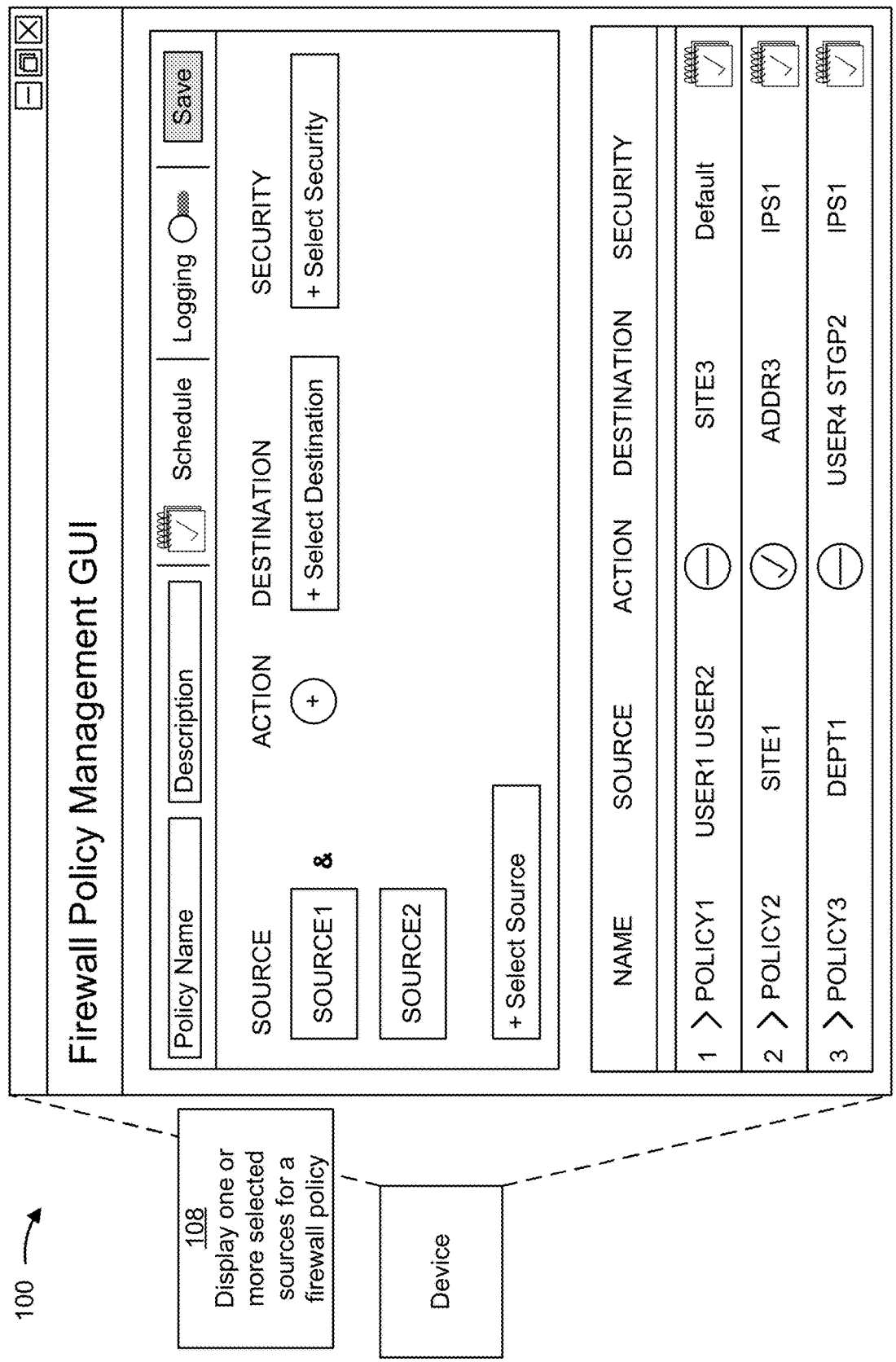

As shown in FIG. 1E, and by reference number 108, the device may generate a display of (and/or may display) the one or more sources selected for the firewall policy. The one or more sources may be displayed in the column for specifying and displaying the one or more sources associated with the firewall policy. For example, the one or more sources may be displayed in a list, in a grid (e.g., a two-column wide grid, a four-column wide grid, and/or the like), and/or the like. Moreover, the source categories in which the one or more sources are included may be displayed in the column for specifying and displaying the one or more sources. The source input field (e.g., the source input box) may be displayed at the bottom or top of the column for specifying and displaying the one or more sources such that a user may add additional sources to the firewall policy.

In some implementations, the device may dynamically adjust the size of the firewall policy interface to accommodate the one or more sources in the column for specifying and displaying the one or more sources. For example, the device may dynamically increase the length of the firewall policy interface as sources are added to the firewall policy, may decrease the length of the firewall policy interface as sources are removed from the firewall policy, and/or the like.

Figure 1F:
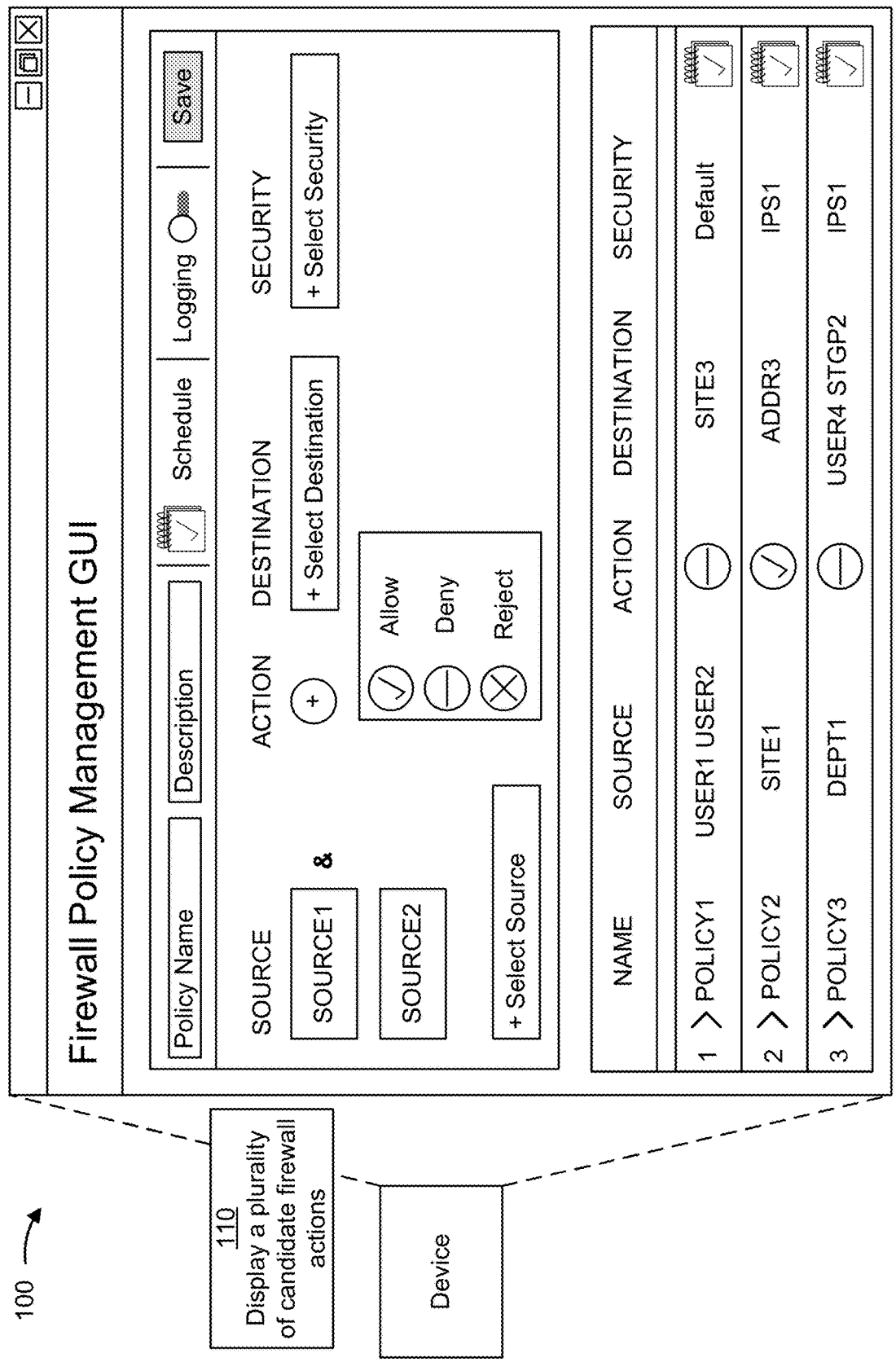

As shown in FIG. 1F, and by reference number 110, the device may receive an input, via the firewall policy interface, associated with the firewall action input field. For example, the user may select the firewall action input field in order to input a firewall action for a firewall policy (e.g., a new firewall policy, an existing firewall policy, and/or the like). The device may generate, based on receiving the input, a display of (and/or may display) a dropdown menu that includes a plurality of candidate firewall actions. The firewall actions may be described via a text-based description (e.g., Allow, Deny, Reject, and/or the like), via a graphical representation (e.g., an icon, a symbol, and/or the like), and/or the like. A user may interact with the dropdown menu to select a firewall action, from the candidate firewall actions, for the firewall policy.

Figure 1G:
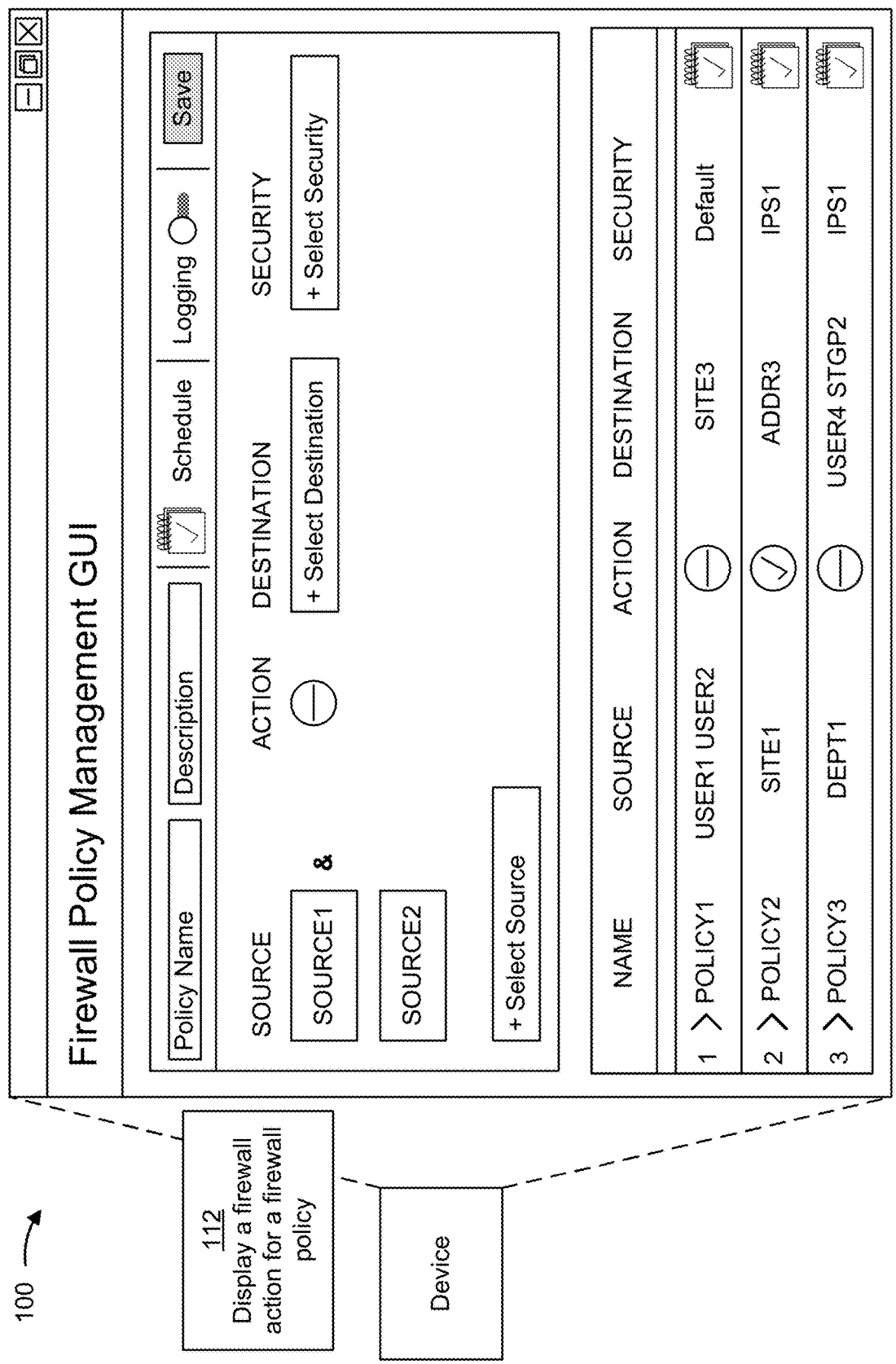

As shown in FIG. 1G, and by reference number 112, the device may generate a display of (and/or may display) the firewall action selected for the firewall policy. The firewall action may be displayed in the column for specifying and displaying the firewall action associated with the firewall policy. For example, the firewall action may be displayed as a text-based description of the firewall action, as a graphical representation of the firewall action, and/or the like. In some implementations, a user may interact with the display of the firewall action to modify the selected firewall action for the firewall policy.

Figure 1H:
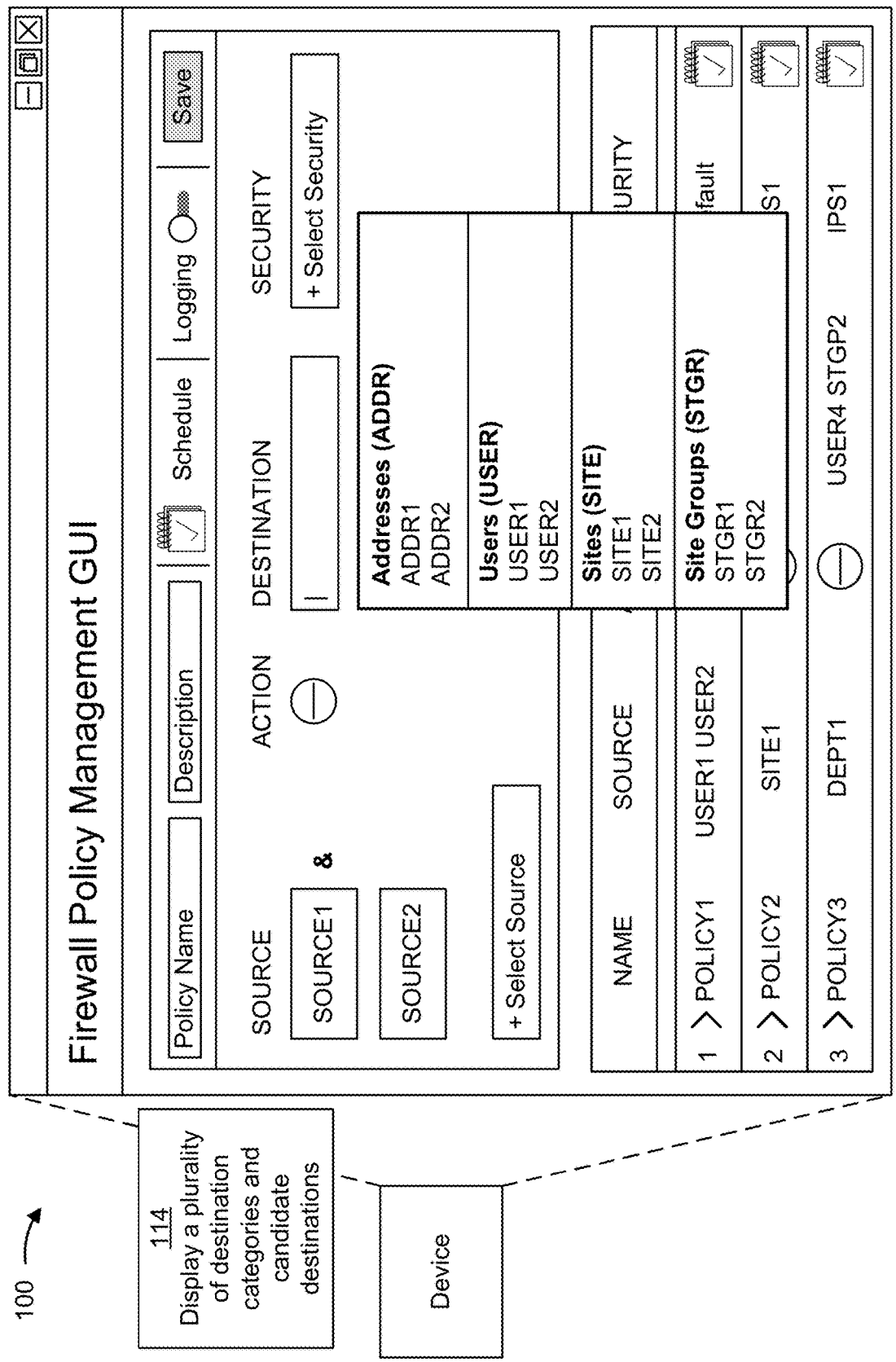

As shown in FIG. 1H, and by reference number 114, the device may receive an input, via the firewall policy interface, associated with the destination input field. For example, the user may select the destination input field in order to input one or more destinations for a firewall policy (e.g., a new firewall policy, an existing firewall policy, and/or the like). The device may generate, based on receiving the input, a display of (and/or may display) a dropdown menu that includes a plurality of candidate destinations and/or one or more destination categories in which the plurality of candidate destinations are included. That is, each of the candidate destinations may be arranged in the dropdown menu based on the destination category in which each candidate destination is included.

In some implementations, the user may select destinations from the dropdown menu, may begin typing a name of a destination which may cause the plurality of candidate destinations and/or destination categories listed in the dropdown menu to update, may select an option in the dropdown menu to view more destinations, and/or the like. In some implementations, if the option to view more destinations is selected, the device may generate a display of (and/or may display) a panel (e.g., a side panel, a bottom panel, and/or the like), in the firewall policy management GUI, that includes additional destinations that may be selected for the firewall policy. For example, the device may generate the display of a panel similar to the panel described above in connection with FIG. 1D.

As shown in FIG. 1I, and by reference number 116, the device may generate a display of (and/or may display) the one or more destinations selected for the firewall policy. The one or more destinations may be displayed in the column for specifying and displaying the one or more destinations associated with the firewall policy. For example, the one or more destinations may be displayed in a list, in a grid (e.g., a two-column wide grid, a four-column wide grid, and/or the like), and/or the like. Moreover, the destination categories in which the one or more destinations are included may be displayed in the column for specifying and displaying the one or more destinations. The destination input field (e.g., the destination input box) may be displayed at the bottom or top of the column for specifying and displaying the one or more destinations such that a user may add additional destinations to the firewall policy.

In some implementations, the device may dynamically adjust the size of the firewall policy interface to accommodate the one or more destinations in the column for specifying and displaying the one or more destinations. For example, the device may dynamically increase the length of the firewall policy interface as destinations are added to the firewall policy, may decrease the length of the firewall policy interface as destinations are removed from the firewall policy, and/or the like.

Figure 1J:
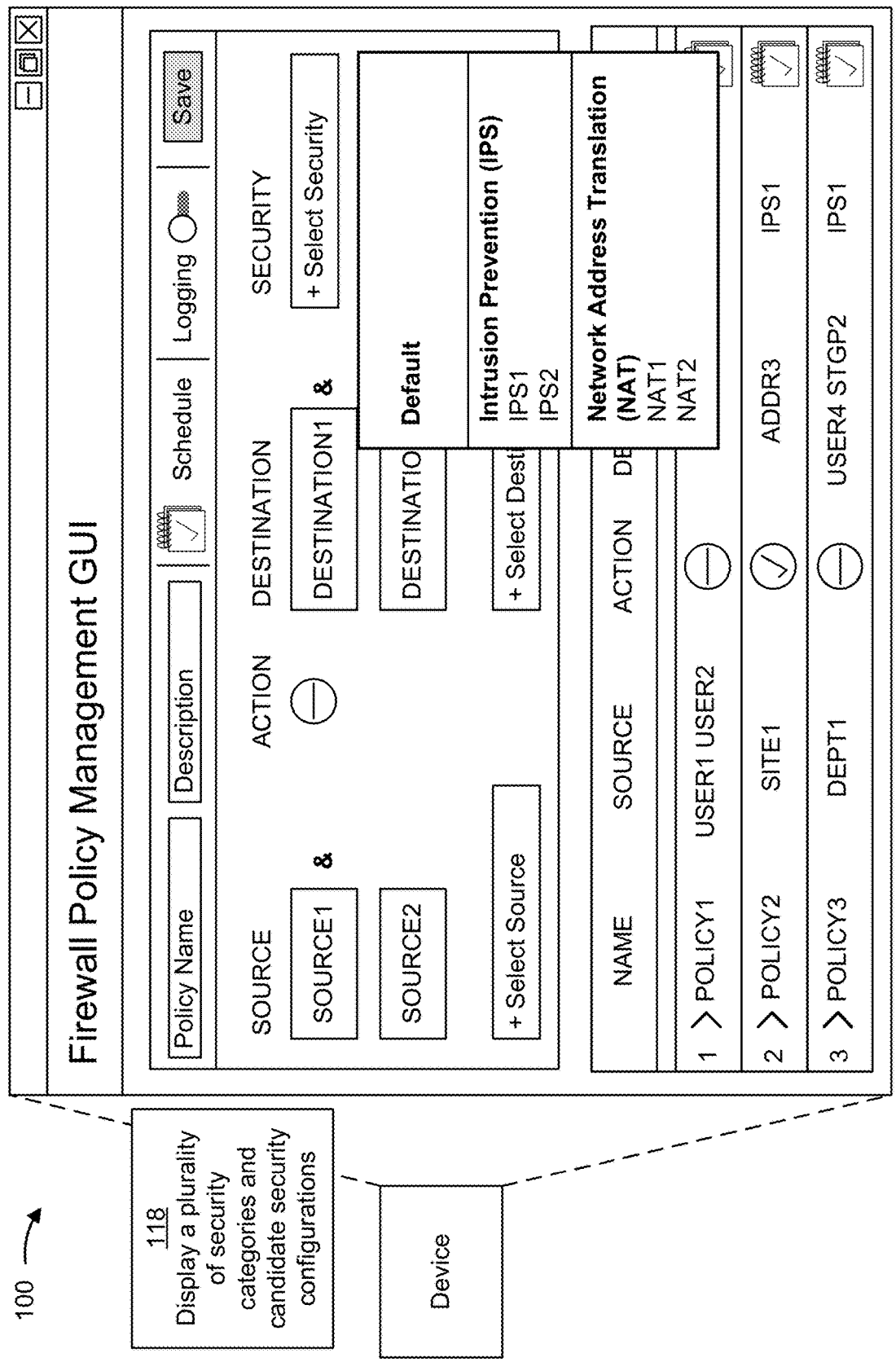

As shown in FIG. 1J, and by reference number 118, the device may receive an input, via the firewall policy interface, associated with the security configuration input field. For example, the user may select the security configuration input field in order to input one or more security configurations for a firewall policy (e.g., a new firewall policy, an existing firewall policy, and/or the like). The device may generate, based on receiving the input, a display of (and/or may display) a dropdown menu that includes a plurality of candidate security configurations and/or one or more security configuration categories in which the plurality of candidate security configurations are included. That is, each of the candidate security configurations may be arranged in the dropdown menu based on the security configuration category in which each candidate security configuration is included.

In some implementations, the user may select security configurations from the dropdown menu, may begin typing a name of a security configuration which may cause the plurality of candidate security configurations and/or security configuration categories listed in the dropdown menu to update, may select an option in the dropdown menu to view more security configurations, and/or the like. In some implementations, if the option to view more security configurations is selected, the device may generate a display of (and/or may display) a panel (e.g., a side panel, a bottom panel, and/or the like), in the firewall policy management GUI, that includes additional security configurations that may be selected for the firewall policy. For example, the device may generate the display of a panel similar to the panel described above in connection with FIG. 1D.

Figure 1K:
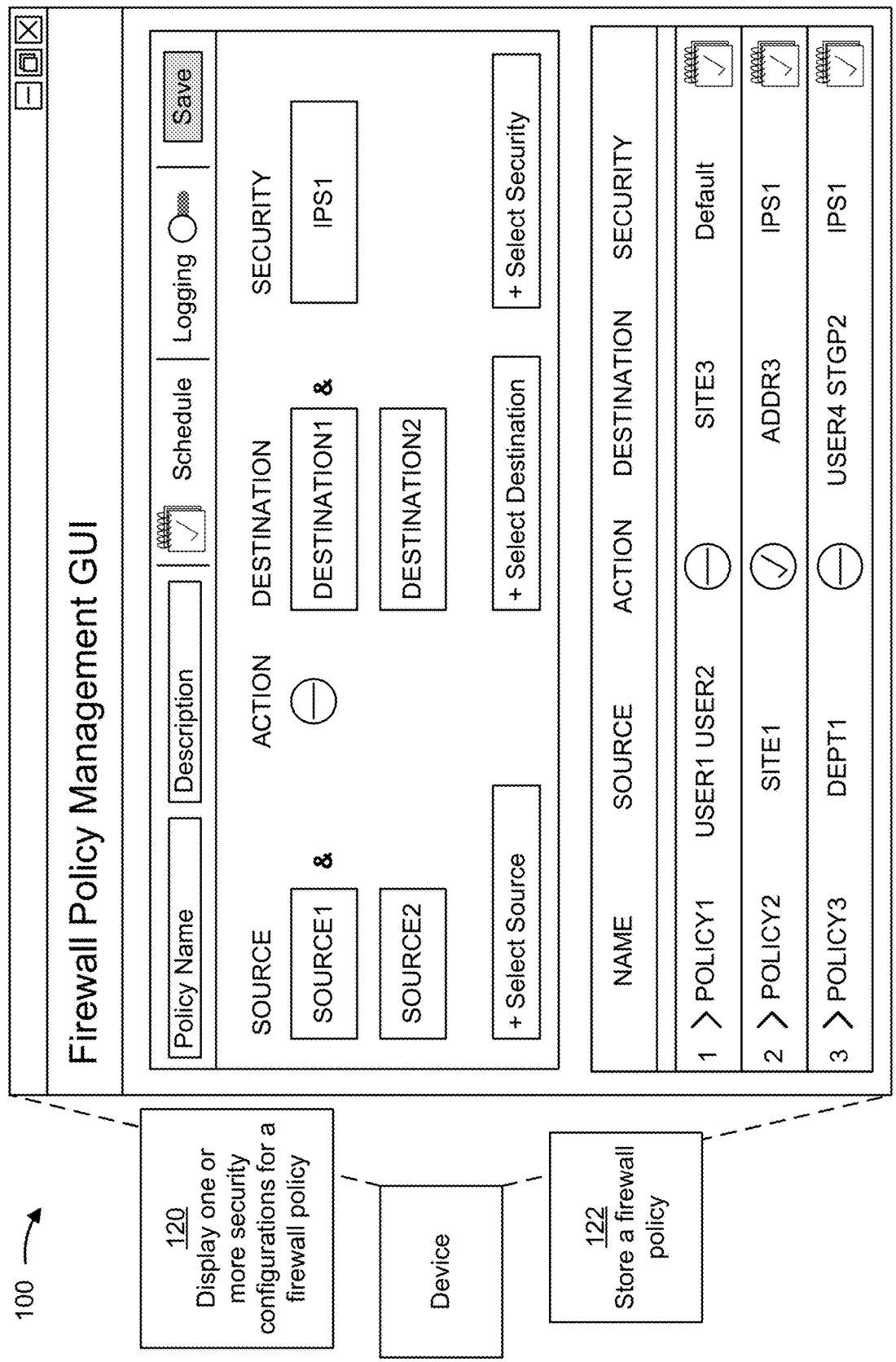

As shown in FIG. 1K, and by reference number 120, the device may generate a display of (and/or may display) the one or more security configurations selected for the firewall policy. The one or more security configurations may be displayed in the column for specifying and displaying the one or more security configurations associated with the firewall policy. For example, the one or more security configurations may be displayed in a list, in a grid (e.g., a two-column wide grid, a four-column wide grid, and/or the like), and/or the like. Moreover, the candidate security configurations in which the one or more security configurations are included may be displayed in the column for specifying and displaying the one or more security configurations. The security configuration input field (e.g., the security configuration input box) may be displayed at the bottom or top of the column for specifying and displaying the one or more security configurations such that a user may add additional security configurations to the firewall policy.

In some implementations, the device may dynamically adjust the size of the firewall policy interface to accommodate the one or more security configurations in the column for specifying and displaying the one or more security configurations. For example, the device may dynamically increase the length of the firewall policy interface as security configurations are added to the firewall policy, may decrease the length of the firewall policy interface as security configurations are removed from the firewall policy, and/or the like.

As further shown in FIG. 1K, and by reference number 122, the device may store a firewall policy based on receiving input via the firewall policy interface. For example, a user may provide the input by interacting with a save button displayed in the firewall policy interface. The interaction with the save button may cause a new firewall policy to be generated and stored, may cause modifications to an existing firewall policy to be stored, and/or the like.

The device may store and display the firewall policy in the list of existing firewall policies such that the firewall policy may be viewed along with other existing firewall policies, may be selected from the list for modification, may be referenced when generating additional firewall policies, and/or the like.

In this way, the device is capable of generating an efficient and intuitive firewall policy management GUI. The firewall policy management GUI may include a display of a list of existing firewall policies adjacent to a firewall policy interface (e.g., for generating and/or modifying firewall policies) in the same view or page, such that a user of the firewall policy management GUI is provided with an unobstructed view of the existing firewall policies and the firewall policy interface. Moreover, the firewall policy interface may display the parameters of a firewall policy, and the corresponding input fields for the parameters, in a single view such that the user can easily view and comprehend the purpose of the firewall policy, such that the user can view existing firewall policies when generating a new firewall policy, and/or the like. As a result, the device generates fewer screens, pages, and/or views when the user is generating a new firewall policy, which reduces the device's consumption of processing, memory, and/or network resources in generating and displaying the firewall policy management GUI, decreases the time duration of generating the new firewall policy, and/or the like.

Moreover, the firewall policy interface may permit the user to generate complex and customizable firewall policies by permitting the user to select combinations of a plurality of sources, destinations, and/or security configurations for a firewall policy. This increases flexibility in generating firewall policies, decreases the quantity of firewall policies that need to be generated in order to enforce firewall policies for traffic associated with various combinations of sources and destinations (e.g., relative to generating firewall policies for individual source and destination combinations), and/or the like.

As indicated above, FIGS. 1A-1K are provided merely as one or more examples. Other examples may differ from what is described with regard to FIGS. 1A-1K.

Figure 2:
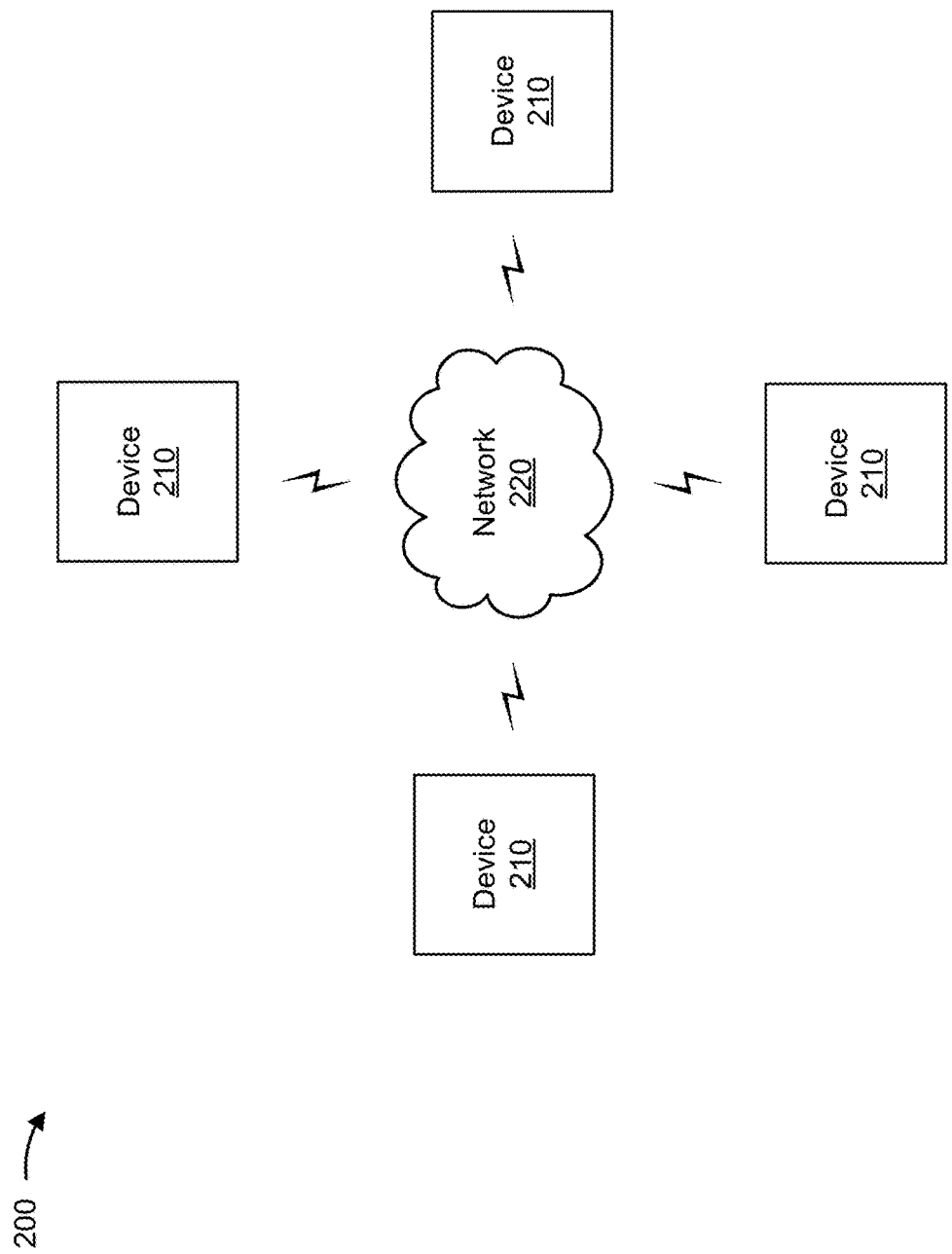
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more devices 210 (collectively referred to as "devices 210" and individually as "device 210") communicatively connected via a network 220. Devices of environment 200 may interconnect via wired connections, wireless connections, or a combination of wired and wireless connections.

Device 210 includes one or more devices capable of receiving, generating, storing, processing, displaying, and/or providing data associated with displaying a firewall policy interface, as described herein. In some implementations, device 210 may include a user device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a desktop computer, or a similar type of device. In some implementations, device 210 may include a stand-alone server, a rack-mountable server, a blade server, a data center, a virtualized server, a plurality of servers, and/or the like. In some implementations, device 210 may include a network device, such as a firewall, a router, a gateway, a switch, a bridge, a wireless access point, a base station (e.g., eNodeB, NodeB, gNodeB, and/or the like), and/or the like. In some implementations, device 210 may be implemented as a physical device implemented within a housing, such as a chassis. In some implementations, device 210 may be implemented as a virtual device implemented by one or more computer devices of a cloud computing environment or a data center.

In some implementations, a device 210 may generate a display of a firewall policy management GUI such that the firewall policy management GUI may be displayed on another device 210 via network 220. In some implementations, a device 210 may generate and display a firewall policy management GUI. In some implementations, a device 210 may generate a display of, and/or may display, a firewall policy management GUI similar to the firewall policy management GUI described above in connection with FIGS. 1A-1J. For example, the firewall policy management GUI may include a display of a list of existing firewall policies adjacent to a firewall policy interface (e.g., for generating and/or modifying firewall policies) in the same view or page, such that a user of the firewall policy management GUI is provided with an unobstructed view of the existing firewall policies and the firewall policy interface. Moreover, the firewall policy interface may display the parameters of a firewall policy, and the corresponding input fields for the parameters, in a single view such that the user can easily view and comprehend the purpose of the firewall policy, such that the user can view existing firewall policies when generating a new firewall policy, and/or the like.

Network 220 includes one or more wired and/or wireless networks. For example, network 220 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3B:
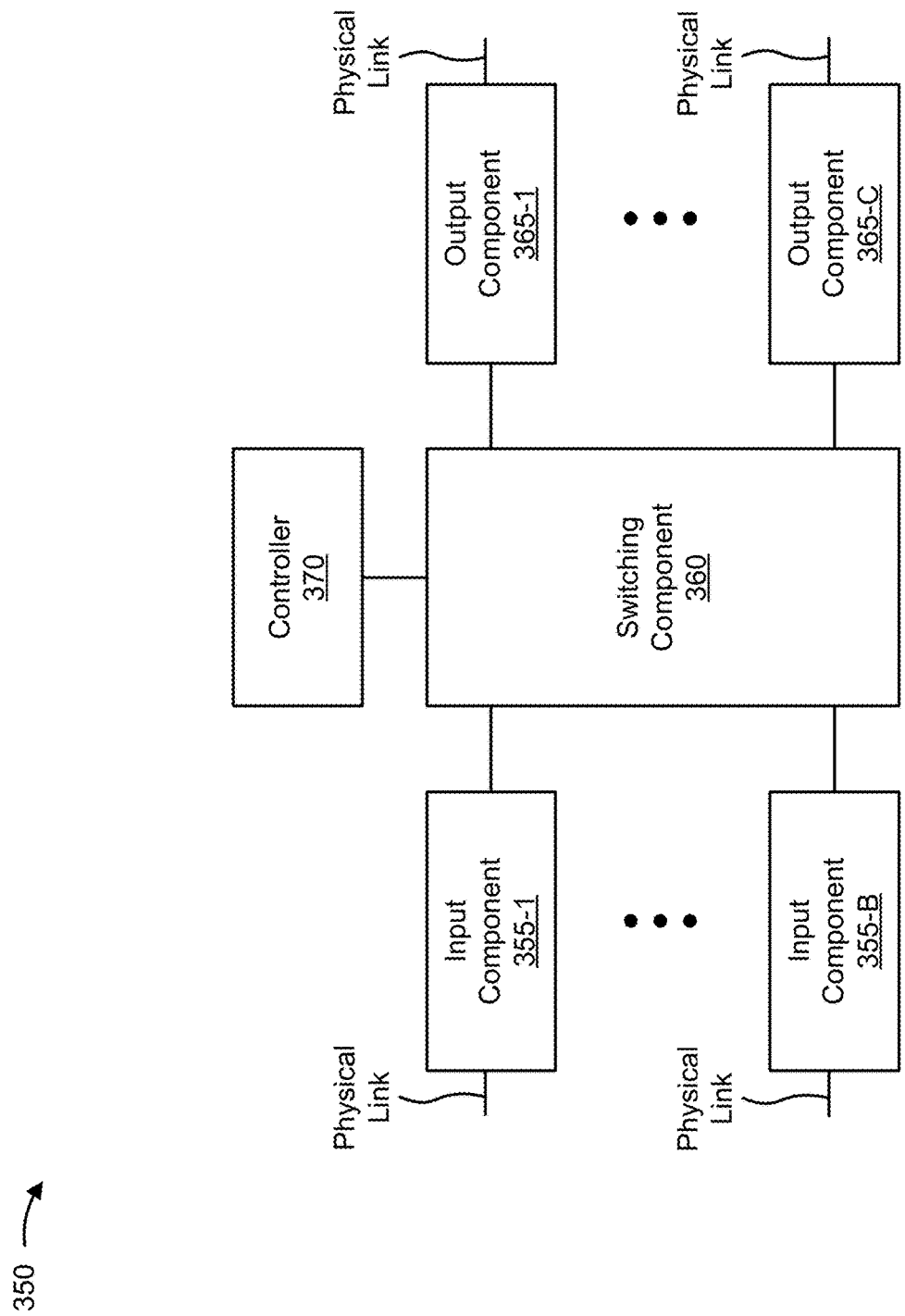

FIGS. 3A and 3B are diagrams of example components of one or more devices of FIG. 2. FIG. 3A is a diagram of example components of a device 300. In some implementations, device 300 may correspond to device 210. In some implementations, device 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to device 210. In some implementations, device 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may provide one or more points of attachment for physical links and may provide one or more points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
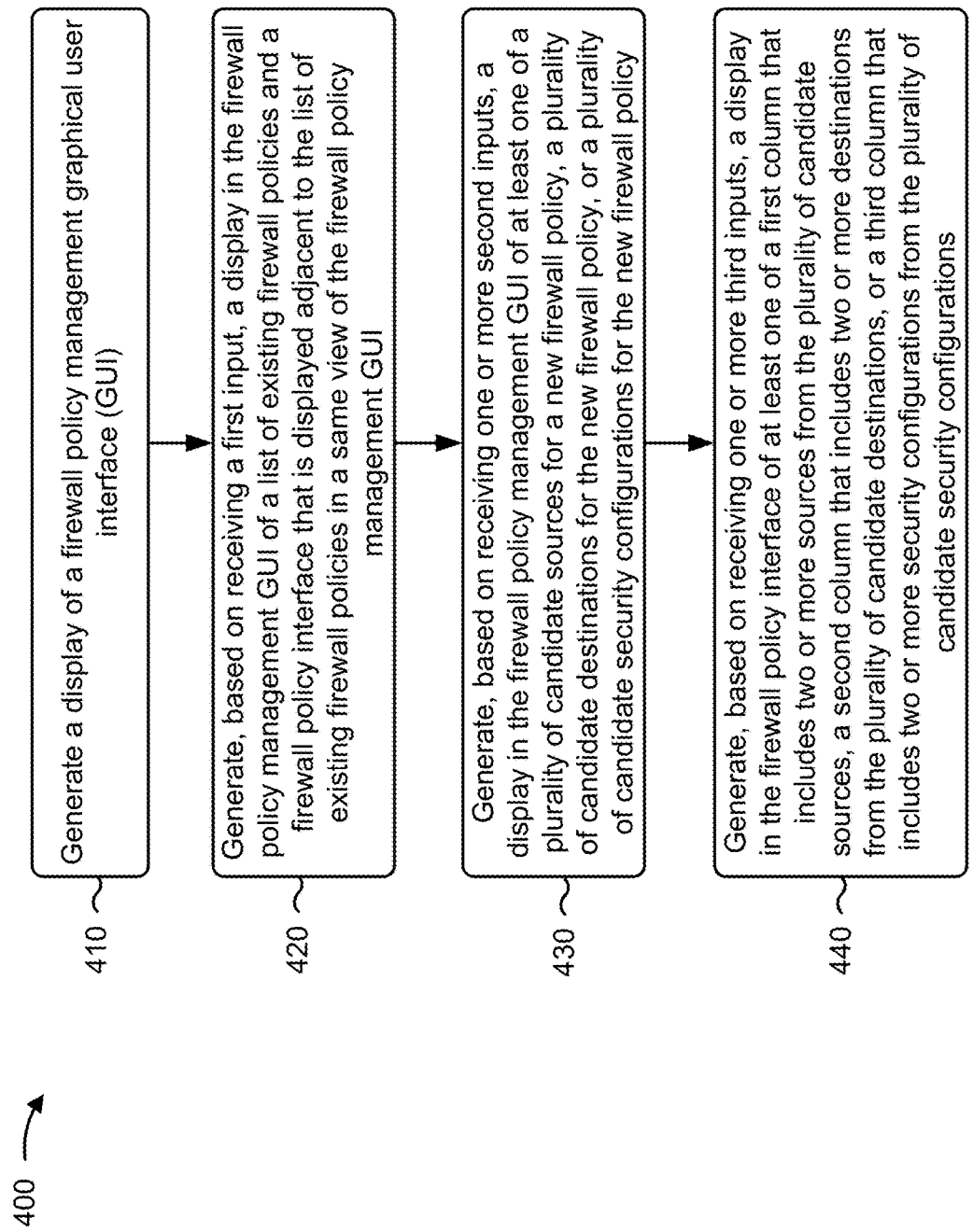

FIG. 4 is a flow chart of an example process 400 for displaying a firewall policy interface. In some implementations, one or more process blocks of FIG. 4 may be performed by device (e.g., device 210, device 300, device 350, and/or the like). In some implementations, one or more process blocks of FIG. 4 may be performed by another device or a group of devices separate from or including the device.

As shown in FIG. 4, process 400 may include generating a display of a firewall policy management GUI (block 410). For example, the device (e.g., using processor 310, memory 315, storage component 320, input component 325, output component 330, communication interface 335, input component 355, switching component 360, output component 365, controller 370, and/or the like) may generate a display of a firewall policy management GUI, as described above.

As further shown in FIG. 4, process 400 may include generating, based on receiving a first input, a display in the firewall policy management GUI of a list of existing firewall policies and a firewall policy interface that is displayed adjacent to the list of existing firewall policies in a same view of the firewall policy management GUI (block 420). For example, the device (e.g., using processor 310, memory 315, storage component 320, input component 325, output component 330, communication interface 335, input component 355, switching component 360, output component 365, controller 370, and/or the like) may generate, based on receiving a first input, a display in the firewall policy management GUI of a list of existing firewall policies and a firewall policy interface that is displayed adjacent to the list of existing firewall policies in a same view of the firewall policy management GUI, as described above.

As further shown in FIG. 4, process 400 may include generating, based on receiving one or more second inputs, a display in the firewall policy management GUI of at least one of a plurality of candidate sources for a new firewall policy, a plurality of candidate destinations for the new firewall policy, or a plurality of candidate security configurations for the new firewall policy (block 430). For example, the device (e.g., using processor 310, memory 315, storage component 320, input component 325, output component 330, communication interface 335, input component 355, switching component 360, output component 365, controller 370, and/or the like) may generate, based on receiving one or more second inputs, a display in the firewall policy management GUI of at least one of a plurality of candidate sources for a new firewall policy, a plurality of candidate destinations for the new firewall policy, or a plurality of candidate security configurations for the new firewall policy, as described above.

As further shown in FIG. 4, process 400 may include generating, based on receiving one or more third inputs, a display in the firewall policy interface of at least one of a first column that includes two or more sources from the plurality of candidate sources, a second column that includes two or more destinations from the plurality of candidate destinations, or a third column that includes two or more security configurations from the plurality of candidate security configurations (block 440). For example, the device (e.g., using processor 310, memory 315, storage component 320, input component 325, output component 330, communication interface 335, input component 355, switching component 360, output component 365, controller 370, and/or the like) may generate, based on receiving one or more third inputs, a display in the firewall policy interface of at least one of a first column that includes two or more sources from the plurality of candidate sources, a second column that includes two or more destinations from the plurality of candidate destinations, or a third column that includes two or more security configurations from the plurality of candidate security configurations, as described above.

Process 400 may include additional implementations, such as any single implementation or any combination of implementations described below and/or in connection with one or more other processes described elsewhere herein.

In a first implementation, the new firewall policy includes the two or more sources from the plurality of candidate sources, and process 400 further comprises receiving a fourth input, associated with a dropdown menu that is associated with the plurality of candidate sources, corresponding to a selection of the two or more sources. In a second implementation, alone or in combination with the first implementation, the new firewall policy includes the two or more sources from the plurality of candidate sources and the two or more destinations from the plurality of candidate destinations, and process 400 further comprises displaying, in a same view of the firewall policy interface in the firewall policy management GUI, the two or more sources and the two or more destinations.

In a third implementation, alone or in combination with one or more of the first and second implementations, displaying, in a same view of the firewall policy interface in the firewall policy management GUI, a source input box in the first column, a destination input field in the second column, and a security configuration input field in the third column. In a fourth implementation, alone or in combination with one or more of the first through third implementations, the plurality of candidate sources are included in one or more source categories and the one or more source categories include at least one of a user category, a site category, an address category, a site group category, an application category, or an application group category.

In a fifth implementation, alone or in combination with one or more of the first through fourth implementations, the plurality of candidate destinations are included in one or more destination categories, and the one or more destination categories include at least one of a user category, a site category, an address category, a site group category, an application category, or an application group category. In a sixth implementation, alone or in combination with one or more of the first through fifth implementations, generating the display in the firewall policy management GUI of at least one of the plurality of candidate sources, the plurality of candidate destinations, or the plurality of candidate security configurations for the new firewall policy comprises generating a display in the firewall policy management GUI of the plurality of candidate sources and the plurality of candidate destinations, the plurality of candidate sources being displayed in a first dropdown menu, and the plurality of candidate destinations being displayed in a second dropdown menu.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for displaying a firewall policy interface. In some implementations, one or more process blocks of FIG. 5 may be performed by device (e.g., device 210, device 300, device 350, and/or the like). In some implementations, one or more process blocks of FIG. 5 may be performed by another device or a group of devices separate from or including the device.

As shown in FIG. 5, process 500 may include generating a display of a firewall policy management GUI (block 510). For example, the device (e.g., using processor 310, memory 315, storage component 320, input component 325, output component 330, communication interface 335, input component 355, switching component 360, output component 365, controller 370, and/or the like) may generate a display of a firewall policy management GUI, as described above.

As further shown in FIG. 5, process 500 may include generating, based on receiving a first input, a display in the firewall policy management GUI of a list of existing firewall policies and a firewall policy interface that is displayed adjacent to the list of existing firewall policies in a same view of the firewall policy management GUI (block 520). For example, the device (e.g., using processor 310, memory 315, storage component 320, input component 325, output component 330, communication interface 335, input component 355, switching component 360, output component 365, controller 370, and/or the like) may generate, based on receiving a first input, a display in the firewall policy management GUI of a list of existing firewall policies and a firewall policy interface that is displayed adjacent to the list of existing firewall policies in a same view of the firewall policy management GUI, as described above.

As further shown in FIG. 5, process 500 may include generating, based on receiving one or more second inputs, a display in the firewall policy interface of at least one of a first column that includes two or more sources, selected from a plurality of candidate sources, for a new firewall policy and a first input box associated with the plurality of candidate sources, a second column that includes two or more destinations, selected from a plurality of candidate destinations, for the new firewall policy and a second input box associated with the plurality of candidate destinations, or a third column that includes two or more security configurations, selected from a plurality of candidate security configurations, for the new firewall policy and a third input box associated with the plurality of candidate security configurations (block 530). For example, the device (e.g., using processor 310, memory 315, storage component 320, input component 325, output component 330, communication interface 335, input component 355, switching component 360, output component 365, controller 370, and/or the like) may generate, based on receiving one or more second inputs, a display in the firewall policy interface of at least one of a first column that includes two or more sources, selected from a plurality of candidate sources, for a new firewall policy and a first input box associated with the plurality of candidate sources, a second column that includes two or more destinations, selected from a plurality of candidate destinations, for the new firewall policy and a second input box associated with the plurality of candidate destinations, or a third column that includes two or more security configurations, selected from a plurality of candidate security configurations, for the new firewall policy and a third input box associated with the plurality of candidate security configurations, as described above.

As further shown in FIG. 5, process 500 may include storing, based on receiving a third input, the new firewall policy in the list of existing firewall policies (block 540). For example, the device (e.g., using processor 310, memory 315, storage component 320, input component 325, output component 330, communication interface 335, input component 355, switching component 360, output component 365, controller 370, and/or the like) may store, based on receiving a third input, the new firewall policy in the list of existing firewall policies, as described above.

Process 500 may include additional implementations, such as any single implementation or any combination of implementations described below and/or in connection with one or more other processes described elsewhere herein.

In a first implementation, the new firewall policy includes the two or more sources from the plurality of candidate sources and the two or more destinations from the plurality of candidate destinations, and process 500 further comprises receiving a fourth input, associated with the first input box, corresponding to a selection of the two or more sources, and receiving a fifth input, associated with the second input box, corresponding to a selection of the two or more destinations. In a second implementation, alone or in combination with the first implementation, the new firewall policy includes the two or more sources from the plurality of candidate sources, the two or more destinations from the plurality of candidate destinations, and the two or more security configurations from the plurality of candidate security configurations, and process 500 further comprises displaying, in a same view of the firewall policy interface in the firewall policy management GUI, the first column, the second column, and the third column.

In a third implementation, alone or in combination with one or more of the first and second implementations, the new firewall policy includes the two or more sources from the plurality of candidate sources, and process 500 further comprises receiving a fourth input associated with the first input box, generating a display of a dropdown menu, in the firewall policy management GUI, that includes at least a subset of the plurality of candidate sources, and receiving a fifth input, associated with the dropdown menu, corresponding to a selection of the two or more sources. In a fourth implementation, alone or in combination with one or more of the first through third implementations, process 500 further comprises generating, based on receiving a fourth input, a display in the firewall policy interface of a firewall action, selected from a plurality of candidate firewall actions, for the new firewall policy.

In a fifth implementation, alone or in combination with one or more of the first through fourth implementations, process 500 further comprises generating a display in the firewall policy management GUI of a dropdown menu that includes the plurality of candidate firewall actions. In a sixth implementation, alone or in combination with one or more of the first through fifth implementations, generating the display in the firewall policy interface of the firewall action comprises generating a display in the firewall policy interface of an icon representing the firewall action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for displaying a firewall policy interface. In some implementations, one or more process blocks of FIG. 6 may be performed by device (e.g., device 210, device 300, device 350, and/or the like). In some implementations, one or more process blocks of FIG. 6 may be performed by another device or a group of devices separate from or including the device.

As shown in FIG. 6, process 600 may include generating a display of a firewall policy management GUI (block 610). For example, the device (e.g., using processor 310, memory 315, storage component 320, input component 325, output component 330, communication interface 335, input component 355, switching component 360, output component 365, controller 370, and/or the like) may generate a display of a firewall policy management GUI, as described above.

As further shown in FIG. 6, process 600 may include generating, based on receiving a first input, a display in the firewall policy management GUI of a list of existing firewall policies and a firewall policy interface that is displayed adjacent to the list of existing firewall policies in a same view of the firewall policy management GUI (block 620). For example, the device (e.g., using processor 310, memory 315, storage component 320, input component 325, output component 330, communication interface 335, input component 355, switching component 360, output component 365, controller 370, and/or the like) may generate, based on receiving a first input, a display in the firewall policy management GUI of a list of existing firewall policies and a firewall policy interface that is displayed adjacent to the list of existing firewall policies in a same view of the firewall policy management GUI, as described above.

As further shown in FIG. 6, process 600 may include generating, based on receiving a second input, a display in the firewall policy management GUI of at least one of a first dropdown menu including a plurality of candidate sources for a new firewall policy, a second dropdown menu including a plurality of candidate destinations for the new firewall policy, a third dropdown menu including a plurality of candidate firewall actions for the new firewall policy, or a fourth dropdown menu including a plurality of candidate security configurations for the new firewall policy (block 630). For example, the device (e.g., using processor 310, memory 315, storage component 320, input component 325, output component 330, communication interface 335, input component 355, switching component 360, output component 365, controller 370, and/or the like) may generate, based on receiving a second input, a display in the firewall policy management GUI of at least one of a first dropdown menu including a plurality of candidate sources for a new firewall policy, a second dropdown menu including a plurality of candidate destinations for the new firewall policy, a third dropdown menu including a plurality of candidate firewall actions for the new firewall policy, or a fourth dropdown menu including a plurality of candidate security configurations for the new firewall policy, as described above.

As further shown in FIG. 6, process 600 may include storing, based on receiving a third input, the new firewall policy in the list of existing firewall policies, wherein the new firewall policy includes at least one of two or more sources from the plurality of candidate sources, two or more destinations from the plurality of candidate destinations, a firewall action from the plurality of candidate firewall actions, or two or more security configurations from the plurality of candidate security configurations (block 640). For example, the device (e.g., using processor 310, memory 315, storage component 320, input component 325, output component 330, communication interface 335, input component 355, switching component 360, output component 365, controller 370, and/or the like) may store, based on receiving a third input, the new firewall policy in the list of existing firewall policies, as described above. In some implementations, the new firewall policy includes at least one of two or more sources from the plurality of candidate sources, two or more destinations from the plurality of candidate destinations, a firewall action from the plurality of candidate firewall actions, or two or more security configurations from the plurality of candidate security configurations.

Process 600 may include additional implementations, such as any single implementation or any combination of implementations described below and/or in connection with one or more other processes described elsewhere herein.

In a first implementation, the new firewall policy includes the two or more sources from the plurality of candidate sources, the two or more destinations from the plurality of candidate destinations, and the two or more security configurations from the plurality of candidate security configurations, and process 600 further comprises receiving a fourth input, associated with the first dropdown menu, corresponding to a selection of the two or more sources, receiving a fifth input, associated with the second dropdown menu, corresponding to a selection of the two or more destinations, and receiving a sixth input, associated with the fourth dropdown menu, corresponding to a selection of the two or more security configurations.

In a second implementation, alone or in combination with the first implementation, the plurality of candidate destinations are included in one or more destination categories, the second dropdown includes the one or more destination categories, and the one or more destination categories include at least one of a user category, a site category, an address category, a site group category, an application category, or an application group category. In a third implementation, alone or in combination with one or more of the first and second implementations, process 600 further comprises receiving a fourth input associated with the first dropdown menu and generating, based on receiving the fourth input, a display of a panel menu that includes a second plurality of candidate sources.

In a fourth implementation, alone or in combination with one or more of the first through third implementations, process 600 further comprises generating a display in the firewall policy interface of a scheduling field, and the scheduling field specifies when the new firewall policy is to be applied. In a fifth implementation, alone or in combination with one or more of the first through fourth implementations, process 600 further comprises generating a display in the firewall policy interface of a logging field, and the logging field specifies whether activity logging is activated for the new firewall policy.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   generating, by a device, a display of a firewall policy management graphical user interface (GUI),
      wherein the firewall policy management GUI includes a list of existing firewall policies;
   generating, by the device and based on receiving a first input to create a new firewall policy, a display in the firewall policy management GUI of a firewall policy interface,
      wherein the firewall policy interface is displayed in a same view of the firewall policy management GUI as the list of the existing firewall policies,
      wherein the firewall policy interface does not overlap the list of existing firewall policies in the same view, and
      wherein the firewall policy interface includes:
         a source input field for the new firewall policy,
         a destination input field for the new firewall policy, and
         a security configuration input field for the new firewall policy;
   generating, by the device and based on receiving a second input associated with the source input field, a display in the firewall policy management GUI of a first dropdown menu that includes:
      a plurality of candidate sources for entry into the source input field,
      one or more source categories in which the plurality of candidate sources are included, and
      an option to view more sources;
   generating, by the device and based on receiving a third input associated with the plurality of candidate sources or the option to view more sources, a display in the firewall policy management GUI of a first column that includes one or more sources, from the plurality of candidate sources, that are associated with the new firewall policy;
   generating, by the device and based on receiving a fourth input associated with the destination input field, a display in the firewall policy management GUI of a second dropdown menu that includes:
      a plurality of candidate destinations for entry into the destination input field,
      one or more destination categories in which the plurality of candidate destinations are included, and
      an option to view more destinations;
   generating, by the device and based on receiving a fifth input associated with the plurality of candidate destinations or the option to view more destinations, a display in the firewall policy management GUI of a second column that includes one or more destinations, from the plurality of candidate destinations, that are associated with the new firewall policy;
   generating, by the device and based on receiving a sixth input associated with the security configuration input field, a display in the firewall policy management GUI of a third dropdown menu that includes:
a plurality of candidate security configurations for entry into the security configuration input field,
one or more security configuration categories in which the plurality of candidate security configurations are included, and
an option to view more security configurations;
generating, by the device and based on receiving a seventh input associated with the plurality of candidate security configurations or the option to view more security configurations, a display in the firewall policy management GUI of a third column that includes one or more security configurations, from the plurality of candidate security configurations, that are associated with the new firewall policy.

2. The method of claim 1, wherein the the one or more sources include two or more sources.

3. The method of claim 1, wherein the one or more sources include two or more sources, and
wherein the one or more destinations include two or more destinations; and
wherein the
first column and the second column are displayed in a same view of the firewall policy interface in the firewall policy management GUI.

4. The method of claim 1,
wherein the first column, the second column, and the third column are displayed in a same view of the firewall policy interface in the firewall policy management GUI.

5. The method of claim 1,
wherein the one or more source categories include at least one of:
a user category,
a site category,
an address category,
a site group category,
an application category, or
an application group category.

6. The method of claim 1,
wherein the one or more destination categories include at least one of:
a user category,
a site category,
an address category,
a site group category,
an application category, or
an application group category.

7. The method of claim 1, wherein the list of existing firewall policies includes a plurality of parameters,
wherein the plurality of parameters include:
a policy name parameter,
an action parameter,
a source parameter,
a destination parameter,
a security configuration parameter, and
one or more of a schedule parameter or a logging parameter.

8. A device, comprising:
one or more memories; and
one or more processors, to:
generate a display of a firewall policy management graphical user interface (GUI),
wherein the firewall policy management GUI includes a list of existing firewall policies;
generate, based on receiving a first input to create a new firewall policy, a display in the firewall policy management GUI of a firewall policy interface,
wherein the firewall policy interface is displayed in a same view of the firewall policy management GUI as the list of the existing firewall policies,
wherein the firewall policy interface does not overlap the list of existing firewall policies, and
wherein the firewall policy interface includes:
a source input field for the new firewall policy,
a destination input field for the new firewall policy, and
a security configuration input field for the new firewall policy;
generate, based on receiving a second input associated with the source input field, a display in the firewall policy GUI of a first dropdown menu that includes:
a plurality of candidate sources for entry into the source input field, and
one or more source categories in which the plurality of candidate sources are included;
generate, based on receiving a third input associated with the plurality of candidate sources, a display in the firewall policy management GUI of a first column that includes one or more sources, from the plurality of candidate sources, that are associated with the new firewall policy;
generate, based on receiving a fourth input associated with the destination input field, a display in the firewall policy management GUI of a second dropdown menu that includes:
a plurality of candidate destinations for entry into the destination input field, and
one or more destination categories in which the plurality of candidate destinations are included;
generate, based on receiving a fifth input associated with the plurality of candidate destinations, a display in the firewall policy management GUI of a second column that includes one or more destinations, from the plurality of candidate destinations, that are associated with the new firewall policy;
generate, based on receiving a sixth input associated with the security configuration input field, a display in the firewall policy management GUI of a third dropdown menu that includes:
a plurality of candidate security configurations for entry into the security configuration input field, and
one or more security configuration categories in which the plurality of candidate security configurations are included;
generate, based on receiving a seventh input associated with the plurality of candidate security configurations, a display in the firewall policy management GUI of a third column that includes one or more security configurations, from the plurality of candidate security configurations, that are associated with the new firewall policy; and
store, based on receiving an eighth input associated with the new firewall policy, the new firewall policy in the list of existing firewall policies.

9. The device of claim 8, wherein the the one or more sources includes two or more sources, and the one or more destinations includes two or more destinations.

10. The device of claim 8, wherein the one or more sources includes two or more sources, the one or more destinations includes two or more destinations, and the one or more security configurations includes two or more security configurations; and wherein
the first column, the second column, and the third column are displayed in a same view of the firewall policy interface in the firewall policy management GUI.

11. The device of claim 8, wherein the one or more sources includes two or more sources.

12. The device of claim 8, wherein the firewall policy interface further includes a firewall action input field; and
wherein the one or more processors are further to:
generate, based on receiving a ninth input associated with the firewall action input field, a display in the firewall policy interface of a firewall action, selected from a plurality of candidate firewall actions, for the new firewall policy.

13. The device of claim 12, wherein the one or more processors are further to:
generate a display in the firewall policy management GUI of a fourth dropdown menu that includes the plurality of candidate firewall actions.

14. The device of claim 12, wherein the one or more processors, when generating the display in the firewall policy interface of the firewall action, are to:
generate a display in the firewall policy interface of an icon representing the firewall action.

15. A non-transitory computer-readable medium storing instructions, the instructions comprising:
one or more instructions that, when executed by one or more processors, cause the one or more processors to:
generate a display of a firewall policy management graphical user interface (GUI),
wherein the firewall policy management GUI includes a list of existing firewall policies;
generate, based on receiving a first input to create a new firewall policy, a display in the firewall policy management GUI of a firewall policy interface,
wherein the firewall policy interface that is displayed in a same view of the firewall policy management GUI as the list of existing firewall policies,
wherein the firewall policy interface does not overlap the list of existing firewall policies, and
wherein the firewall policy interface includes:
a source input field for the new firewall policy,
a destination input field for the new firewall policy,
a firewall action input field for the new firewall policy, and
a security configuration input field for the new firewall policy;
generate, based on receiving a second input associated with the source input field, a display in the firewall policy management GUI of a first dropdown menu including:
a plurality of candidate sources for entry into the source input field,
one or more source categories in which the plurality of candidate sources are included, and
an option to view more sources;
generate, based on receiving a third input associated with the destination input field, a display in the firewall policy management GUI of a second dropdown menu including:
a plurality of candidate destinations for entry into the destination input field,
one or more destination categories in which the plurality of candidate destinations are included, and
an option to view more destinations;
generate, based on receiving a fourth input associated with the firewall action input field, a display in the firewall policy management GUI of a third dropdown menu including a plurality of candidate firewall actions for entry into the firewall action input field;
generate, based on receiving a fifth input associated with the security configuration input field, a display in the firewall policy management GUI of a fourth dropdown menu including:
a plurality of candidate security configurations for entry into the security configuration input field,
one or more security configuration categories in which the plurality of candidate security configurations are included, and
an option to view more security configurations; and
store, based on receiving a sixth input associated with the new firewall policy, the new firewall policy in the list of existing firewall policies,
wherein the new firewall policy includes:
one or more sources from the plurality of candidate sources,
one or more destinations from the plurality of candidate destinations,
a firewall action from the plurality of candidate firewall actions, and
one or more security configurations from the plurality of candidate security configurations.

16. The non-transitory computer-readable medium of claim 15, wherein the one or more sources includes two or more sources, the one or more destinations includes two or more destinations, and the one or more security configurations includes two or more security configurations; and
wherein the one or more instructions, when executed by the one or more processors, further cause the one or more processors to:
receive a seventh input, associated with the first dropdown menu, corresponding to a selection of the two or more sources,
receive an eighth input, associated with the second dropdown menu, corresponding to a selection of the two or more destinations, and
receive a ninth input, associated with the fourth dropdown menu, corresponding to a selection of the two or more security configurations.

17. The non-transitory computer-readable medium of claim 15,
wherein the one or more destination categories include at least one of:
a user category,
a site category,
an address category,
a site group category,
an application category, or
an application group category.

18. The non-transitory computer-readable medium of claim 15, wherein the one or more instructions, when executed by the one or more processors, further cause the one or more processors to:
receive a seventh input associated with the option to view more sources; and generate, based on receiving the seventh input, a display of a panel menu, in the firewall policy management GUI, that includes a second plurality of candidate sources for entry into the source input field.

19. The non-transitory computer-readable medium of claim 15, wherein the firewall policy interface further includes a schedule input field; and
   wherein the one or more instructions, when executed by the one or more processors, further cause the one or more processors to:
      generate, based on receiving a seventh input associated with the schedule input field, a display in the firewall policy interface of a schedule that specifies when the new firewall policy is to be applied.

20. The non-transitory computer-readable medium of claim 15, wherein the firewall policy interface further includes a logging input field; and
   wherein the one or more instructions, when executed by the one or more processors, further cause the one or more processors to:
      generate, based on receiving a seventh input associated with the logging input field, a display in the firewall policy interface that specifies whether activity logging is activated for the new firewall policy.

* * * * *